United States Patent
Ko et al.

(10) Patent No.: US 10,939,281 B2
(45) Date of Patent: *Mar. 2, 2021

(54) METHOD OF EXECUTING APPLICATION AND TERMINAL USING THE METHOD

(71) Applicant: SAMSUNG ELECTRONICS CO., LTD., Suwon-si (KR)

(72) Inventors: Jae-woo Ko, Uiwang-si (KR); Hang-sik Shin, Yongin-si (KR); Se-jun Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1124 days.

This patent is subject to a terminal disclaimer.

(21) Appl. No.: 14/021,346

(22) Filed: Sep. 9, 2013

(65) Prior Publication Data
US 2014/0080469 A1    Mar. 20, 2014

(30) Foreign Application Priority Data

Sep. 7, 2012 (KR) .................. 10-2012-0099465

(51) Int. Cl.
*H04M 3/00* (2006.01)
*H04W 8/22* (2009.01)
*H04W 4/80* (2018.01)

(52) U.S. Cl.
CPC ............... *H04W 8/22* (2013.01); *H04W 4/80* (2018.02)

(58) Field of Classification Search
None
See application file for complete search history.

(56) References Cited

U.S. PATENT DOCUMENTS

| 5,054,064 A * | 10/1991 | Walker ................. H04N 7/1675 348/E7.056 |
| 8,079,908 B2 | 12/2011 | Sotoike et al. |
| 8,086,781 B2 | 12/2011 | Ananny et al. |

(Continued)

FOREIGN PATENT DOCUMENTS

| CN | 102117148 A | 7/2011 |
| EP | 1 578 154 A1 | 9/2005 |

(Continued)

OTHER PUBLICATIONS

Communication, dated Jan. 21, 2014, issued by the European Patent Office in counterpart European Patent Application No. 13183328.7.

(Continued)

*Primary Examiner* — Jinsong Hu
*Assistant Examiner* — Alexander J Yi
(74) *Attorney, Agent, or Firm* — Sughrue Mion, PLLC

(57) ABSTRACT

A method of executing an application by a first terminal is provided. The first terminal executes an application with at least one external device connected to the first terminal, and the first terminal transmits, to a second terminal, information about the application and connection information regarding the at least one external device. The second terminal establishes a connection with respect to the at least one external device based on the connection information, and executes the application with the at least one external device connected to the second terminal based on the information about the application.

35 Claims, 17 Drawing Sheets

(56) References Cited

U.S. PATENT DOCUMENTS

| | | | |
|---|---|---|---|
| 8,208,853 | B2 | 6/2012 | Lydon et al. |
| 8,561,207 | B2 | 10/2013 | Chinn et al. |
| 2005/0155077 | A1* | 7/2005 | Lawrence .......... H04N 21/4113 725/109 |
| 2007/0234048 | A1* | 10/2007 | Ziv .................... H04M 3/56 713/159 |
| 2008/0051027 | A1* | 2/2008 | Lee .................... H04N 5/4401 455/3.06 |
| 2008/0320041 | A1 | 12/2008 | Engelsma et al. |
| 2010/0061294 | A1 | 3/2010 | Proctor, Jr. et al. |
| 2010/0222049 | A1* | 9/2010 | Kim .................... G06F 3/04883 455/418 |
| 2010/0262673 | A1 | 10/2010 | Chang et al. |
| 2010/0317289 | A1* | 12/2010 | Desai .................. H04B 17/318 455/41.2 |
| 2011/0030021 | A1* | 2/2011 | Campagna .......... H04N 7/181 725/106 |
| 2011/0176524 | A1* | 7/2011 | Fasbender .......... H04L 12/2809 370/338 |
| 2012/0030343 | A1 | 2/2012 | Ryder |
| 2012/0072871 | A1* | 3/2012 | Seo .................... H04N 5/445 715/838 |
| 2012/0083208 | A1 | 4/2012 | Giles et al. |
| 2012/0159607 | A1 | 6/2012 | Wei et al. |
| 2012/0163241 | A1 | 6/2012 | Sall |
| 2012/0272232 | A1* | 10/2012 | Song .................... G06F 8/61 717/178 |
| 2013/0102250 | A1* | 4/2013 | Mutikainen ......... H04W 76/043 455/41.2 |
| 2014/0017996 | A1* | 1/2014 | Hamilton ............ H04W 4/008 455/41.1 |

FOREIGN PATENT DOCUMENTS

| | | |
|---|---|---|
| GB | 201208205 | 6/2012 |
| JP | 2009-183410 A | 8/2009 |
| JP | 2010-246045 A | 10/2010 |
| JP | 2012-91030 A | 5/2012 |
| JP | 2012-147146 A | 8/2012 |
| TW | 200806060 A | 1/2008 |
| WO | 2009/121409 A1 | 5/1917 |
| WO | 2004/004395 A1 | 1/2004 |
| WO | 2005/109829 A1 | 11/2005 |
| WO | 2007/107982 A1 | 9/2007 |
| WO | 2012/109696 A1 | 8/2012 |

OTHER PUBLICATIONS

International Search Report (PCT/ISA/210), dated Jan. 29, 2014, issued by the International Searching Authority in counterpart International Patent Application No. PCT/KR2013/008007.

Written Opinion (PCT/ISA/237), dated Jan. 29, 2014, issued by the International Searching Authority in counterpart International Patent Application No. PCT/KR2013/008007.

Vijayakumar, Priya, et al., "Application-Independent Session Mobility Between User Terminals," Mobility Aware Technologies and Applications Lecture Notes in Computer Science, vol. 3744, Jan. 1, 2005, pp. 305-315.

Schuchardt, Volker, et al., "Moving Mobile Applications between Mobile Devices Seamlessly," 34th International Conference on Software Engineering (ICSE), Jun. 2, 2012, pp. 1595-1598.

Berti, Silvia, et al., "A Taxonomy for Migratory User Interfaces," Interactive Systems Lecture Notes in Computer Science, vol. 3941, Jan. 1, 2006, pp. 149-160.

Communication dated Nov. 21, 2016 issued by the Japanese Patent Office in counterpart Japanese Patent Application No. 2013-183766.

Mac People Editorial department; "iMac Perfect Guide Plus OS X Lion Edition 2012"; Aski/Media Works; Jan. 16, 2012; pp. 2-5/E; 5 pgs.

Communication dated May 24, 2017 by the State Intellectual Property Office of P.R. China in counterpart Chinese Patent Application No. 201310406791.3.

Communication dated Jul. 10, 2017 by the Japanese Patent Office in counterpart Japanese Patent Application No. 2013-183766.

Communication dated Nov. 13, 2017, issued by the Japanese Patent Office in counterpart Japanese Patent Application No. 2013-183766.

Communication dated Dec. 22, 2017, issued by the European Patent Office in counterpart European Patent Application No. 13183328.7.

Communication dated Jan. 29, 2018, issued by the State Intellectual Property Office of the People's Republic of China in counterpart Chinese Patent Application No. 201310406791.3.

Communication dated Jan. 27, 2020, issued by the Indian Patent Office in counterpart Indian Application No. 3979/CHE/2013.

Communication dated Jul. 6, 2020 by the Intellectual Property Office of Brazil in counterpart Brazilian Patent Application No. BR112015005034-4.

\* cited by examiner

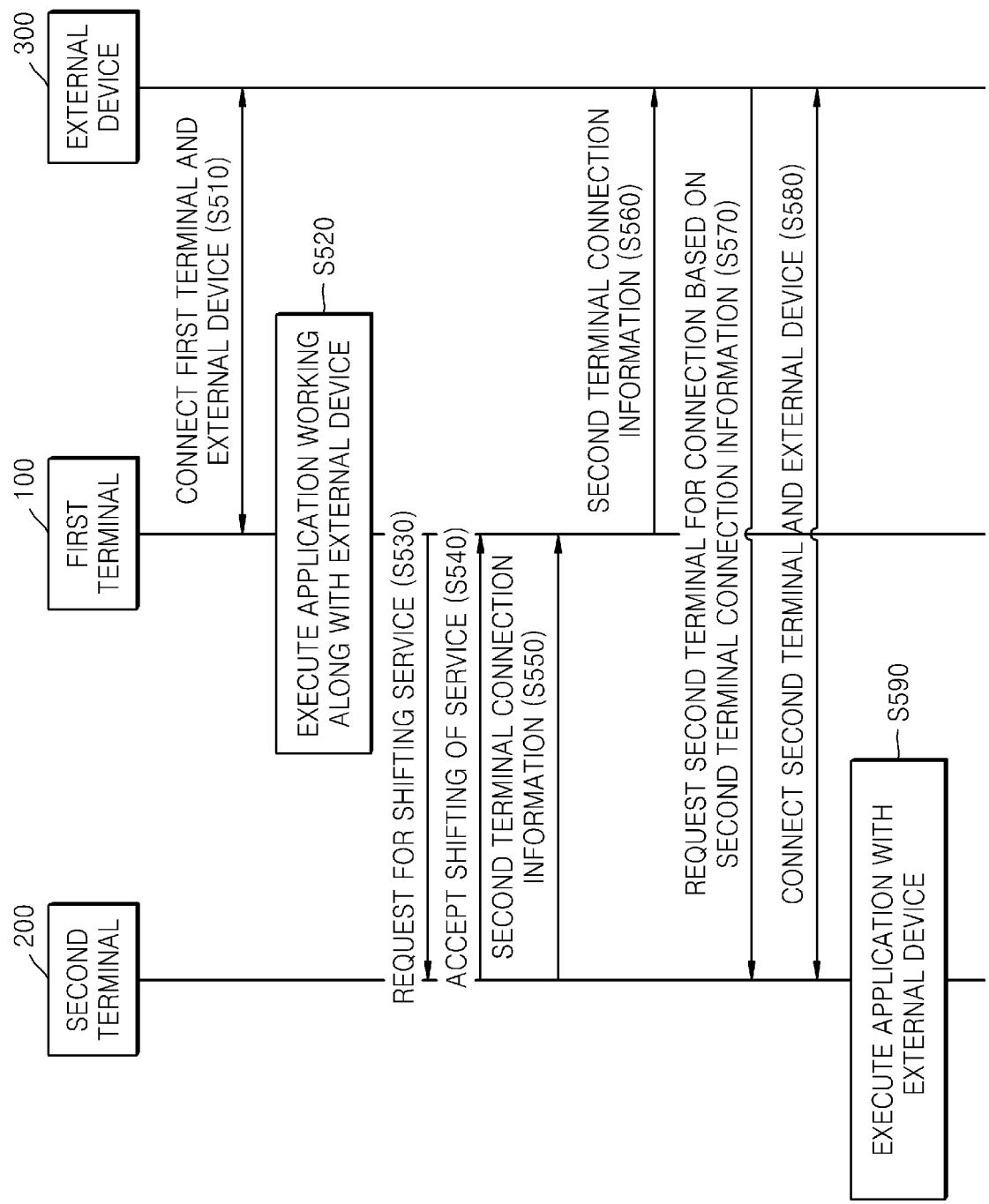

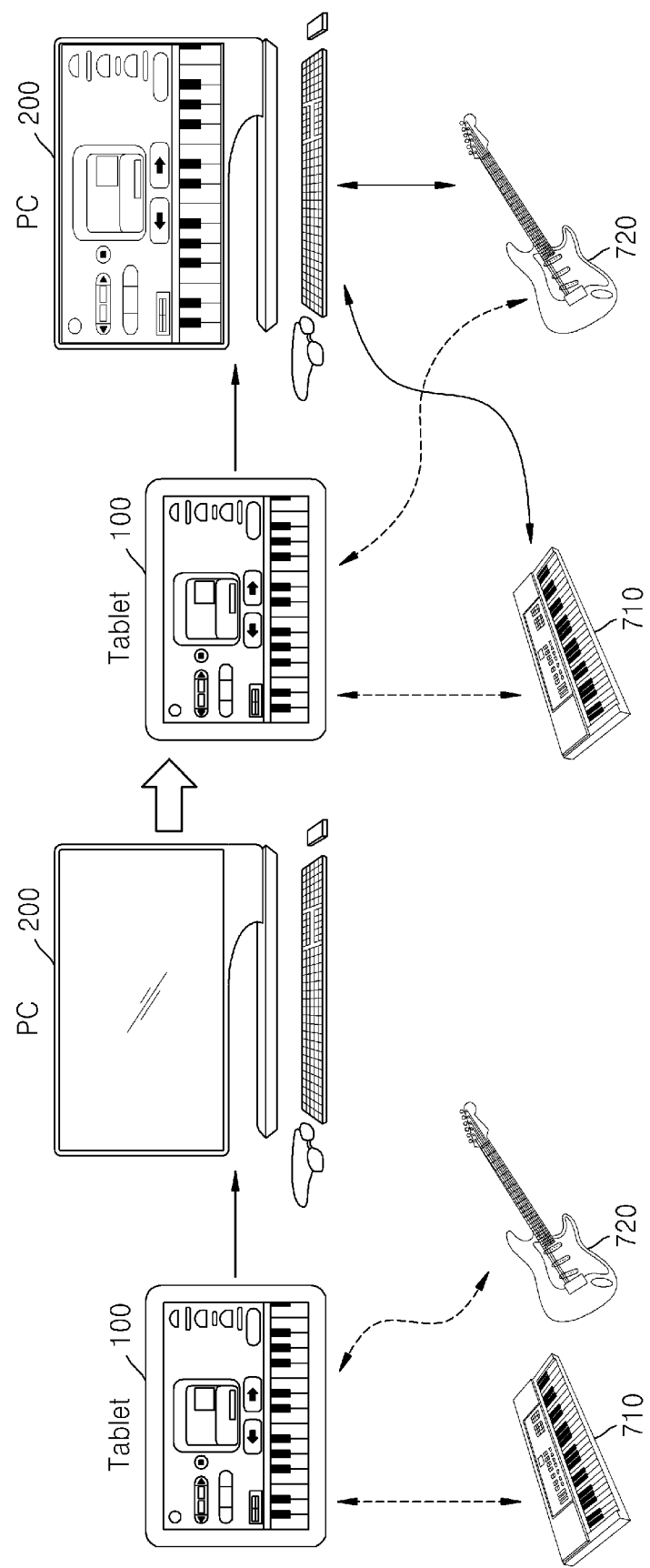

FIG. 8A
FIG. 8B
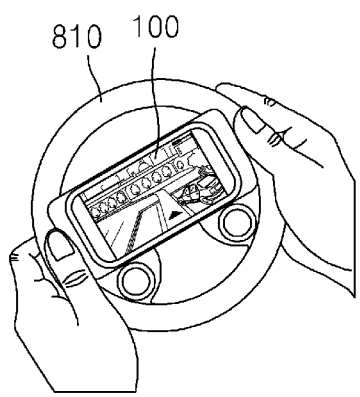
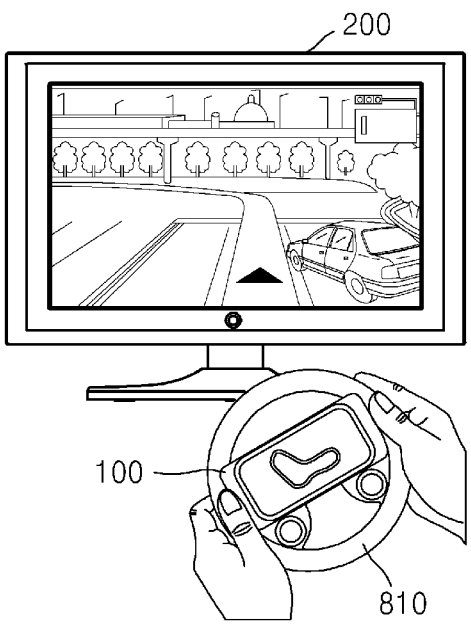

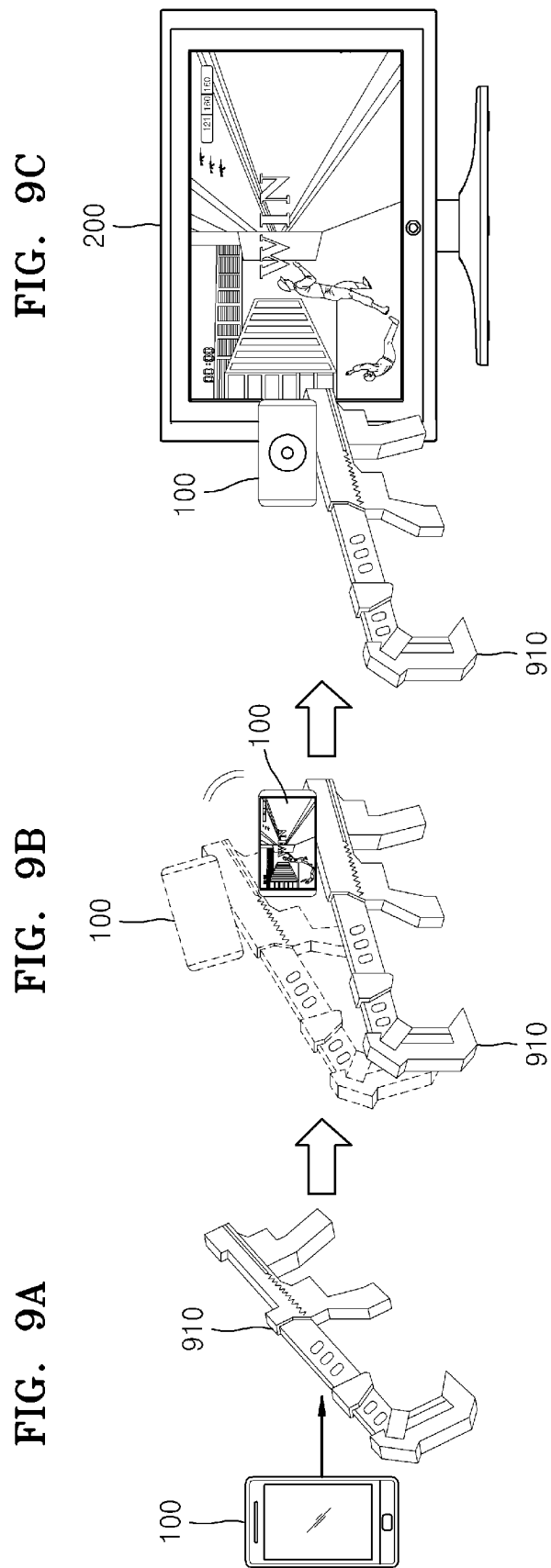

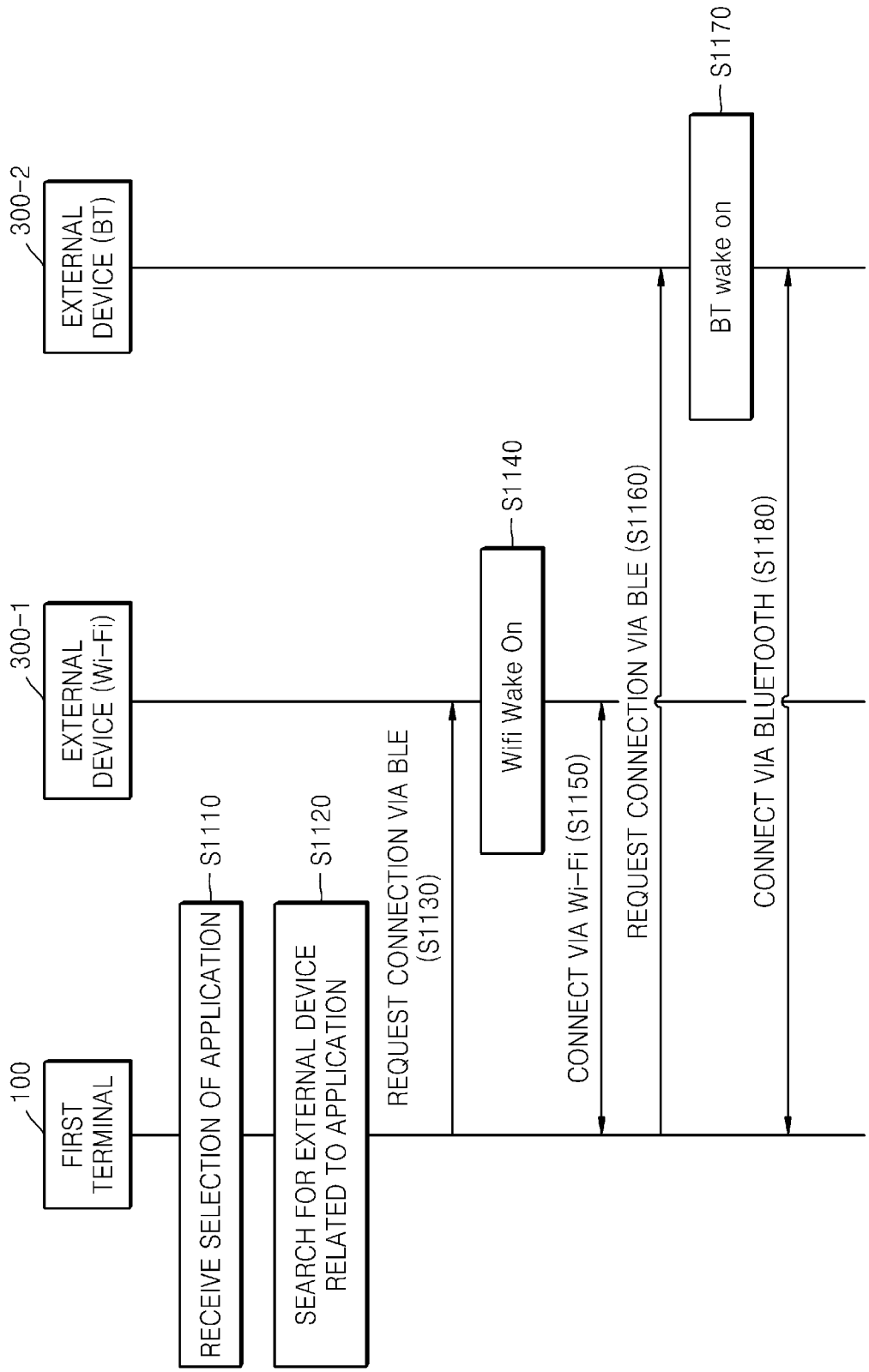

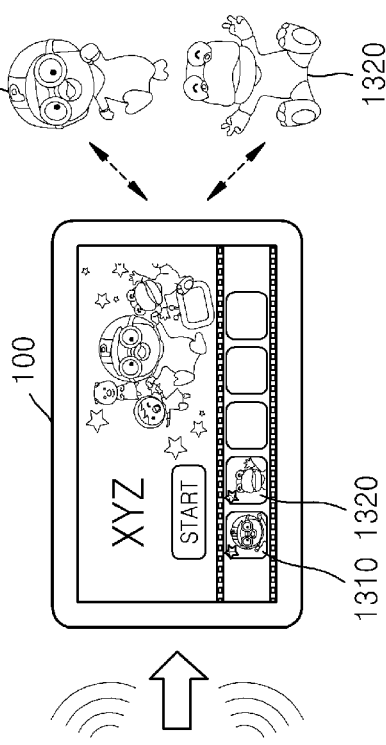
FIG. 13C
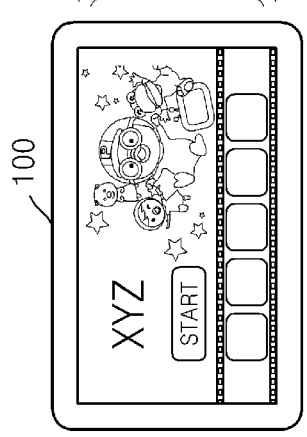
FIG. 13B
FIG. 13A
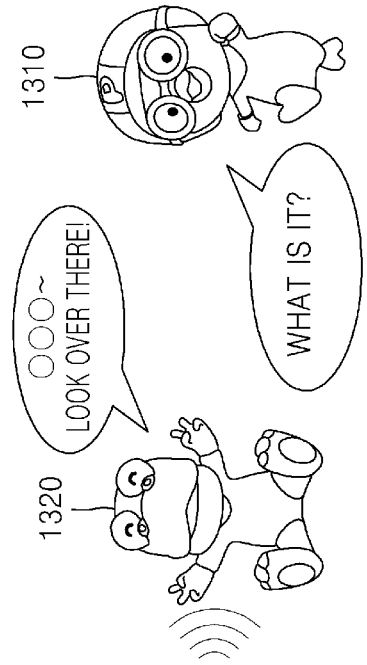
FIG. 13E
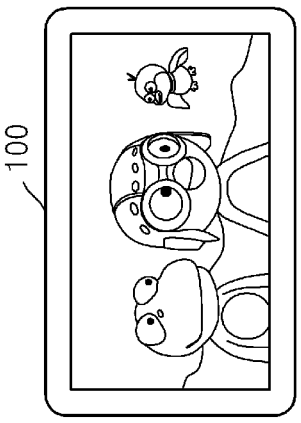
FIG. 13D
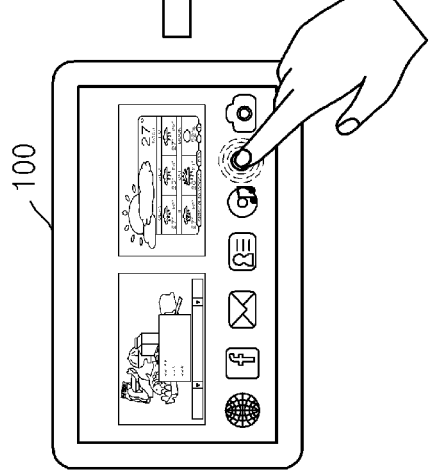

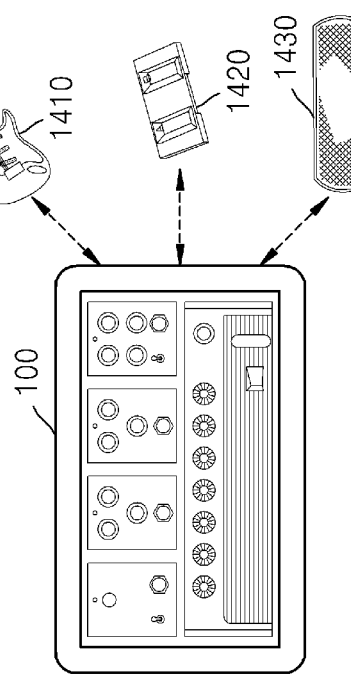
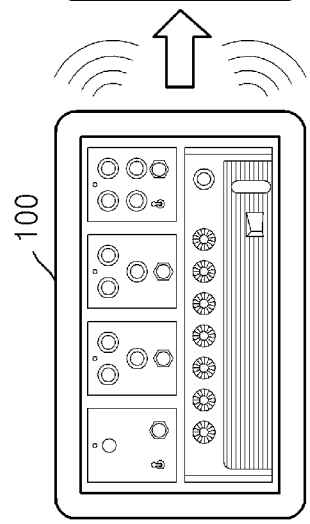
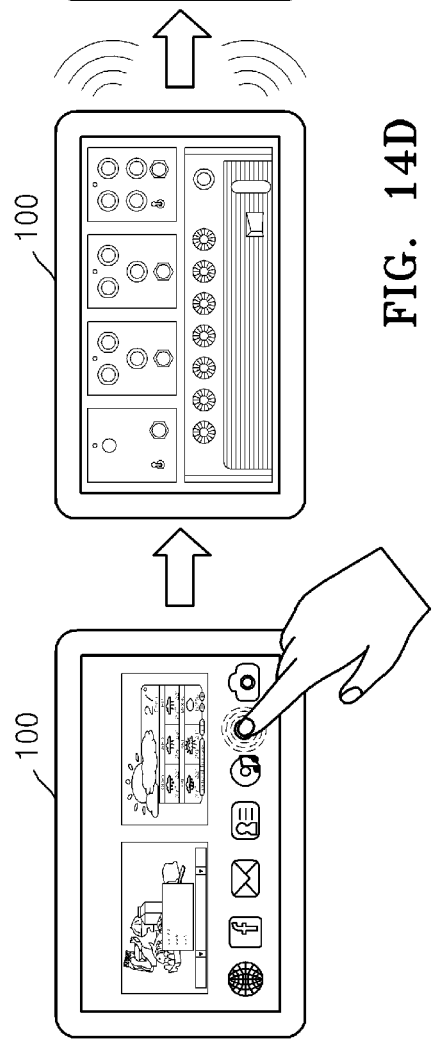
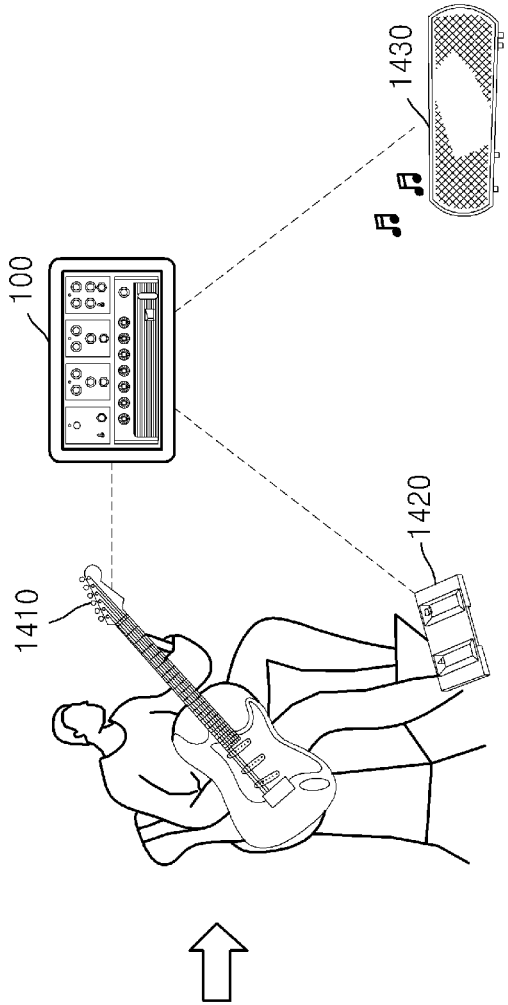

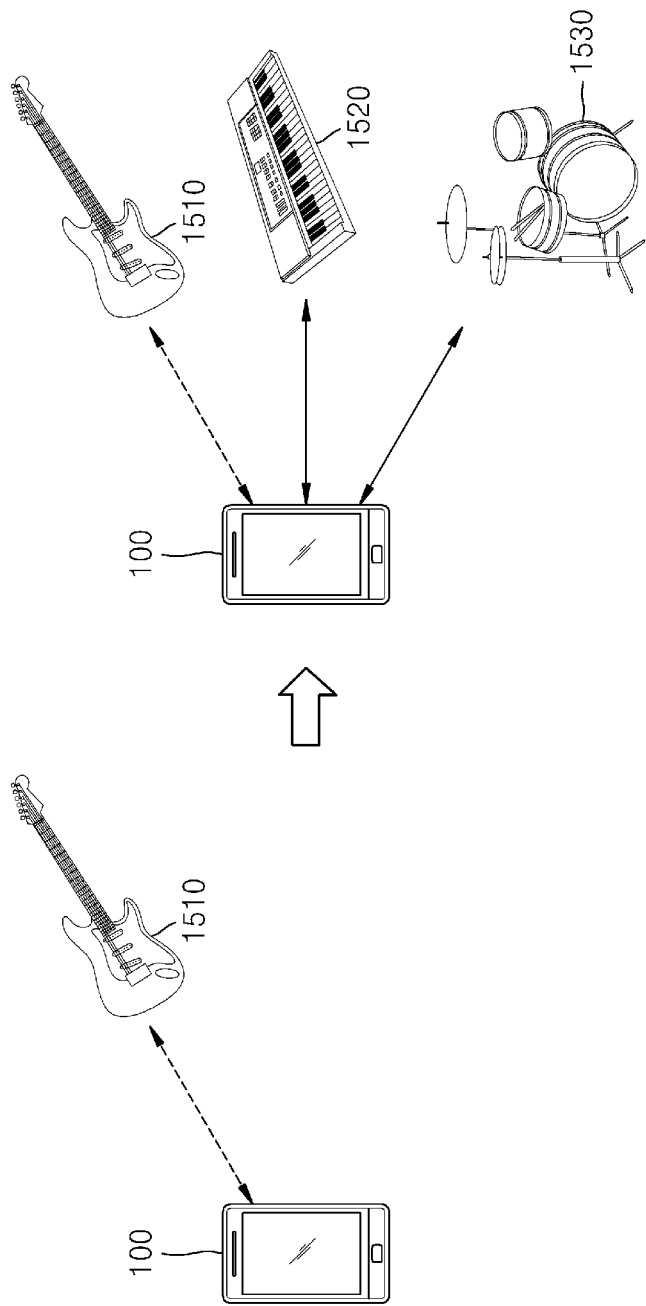

METHOD OF EXECUTING APPLICATION AND TERMINAL USING THE METHOD

CROSS-REFERENCE TO RELATED PATENT APPLICATION

This application claims priority from Korean Patent Application No. 10-2012-0099465, filed on Sep. 7, 2012, in the Korean Intellectual Property Office, the disclosure of which is incorporated herein in its entirety by reference.

BACKGROUND

1. Field

Methods and apparatuses consistent with the exemplary embodiments relate to a method of executing an application by a terminal with an external device connected to the terminal and the terminal in which the method is performed.

2. Description of the Related Art

A mobile terminal may be configured to execute various functions. Examples of the functions include communication of data and sound, capturing an image or recording a video by using a camera, a sound recording function, a replaying function of a music file via a speaker system, or a function of displaying an image or a video.

Certain mobile terminals include an additional function for executing a game, and other terminals are designed as multi-media devices. Moreover, as development of smartphones accelerates, various applications are under development.

While communication technology has gradually advanced, a mobile terminal may execute an application in connection with various external devices. The mobile terminal then undergoes an operation of setting up a connection. Accordingly, a system via which the mobile terminal may be easily connected to an external device without undergoing a complicated connection setting procedure is required.

SUMMARY

The exemplary embodiments provide a method of executing an application, whereby as a service related to an application that is being executed in a first terminal is shifted to a second terminal, an external device connected to the first terminal is also automatically connected to the second terminal, and a terminal in which the method is performed.

According to an aspect of the exemplary embodiments, there is provided a method of executing an application, the method including: executing, by the first terminal, an application with at least one external device connected to the first terminal; transmitting, by the first terminal, to a second terminal, information about the application and connection information regarding the at least one external device, wherein the transmitting is performed by the first terminal; establishing, by the second terminal, a connection with respect to the at least one external device based on the connection information; and executing, by the second terminal, the application with the at least one external device connected to the second terminal based on the information about the application.

According to another aspect of the exemplary embodiments, there is provided a method of executing an application, the method including: executing, by the first terminal, an application with at least one external device connected to the first terminal; transmitting, by the first terminal, to a second terminal, information about the application; transmitting, by the first terminal, connection information regarding the second terminal to the at least one external device; establishing, by the at least one external device, a connection with respect to the second terminal based on the connection information; and executing, by the second terminal, the application with the at least one external device connected to the second terminal based on the information about the application.

According to another aspect of the exemplary embodiments, there is provided a method of executing an application, the method performed by a first terminal and including: executing an application with at least one external device connected to the first terminal; and transmitting to a second terminal information about the application and connection information regarding the at least one external device, wherein the connection information regarding the at least one external device is information for establishing a connection with respect to the at least one external device by the second terminal, wherein the information about the application is information applied by the second terminal to execute the application with the at least one external device.

According to another aspect of the exemplary embodiments, there is provided a method of executing an application, the method performed by a first terminal and including: executing an application with at least one external device connected to the first terminal; transmitting information about the application to a second terminal; and transmitting connection information regarding the second terminal to the at least one external device, wherein the connection information is information for establishing a connection by the at least one external device with respect to the second terminal, wherein the information about the application is information applied by the second terminal in executing the application with the at least one external device.

According to another aspect of the exemplary embodiments, there is provided a method of executing an application, the method performed by a second terminal and including: receiving, from a first terminal, information about an application being executed on the first terminal and connection information regarding at least one external device connected to the first terminal; establishing a connection with respect to the at least one external device based on the connection information; and executing the application with the at least one external device connected to the second terminal based on the information about the application.

According to another aspect of the exemplary embodiments, there is provided a first terminal comprising: a controller configured to execute an application with at least one external device connected to the first terminal; and a communication device configured to transmit information about the application and connection information regarding the at least one external device to a second terminal, wherein the connection information regarding the at least one external device is information for establishing a connection by the second terminal with the at least one external device, wherein the information about the application is information applied by the second terminal to execute the application with the at least one external device.

According to another aspect of the exemplary embodiments, there is provided a first terminal comprising: a controller configured to execute an application with at least one external device connected to the first terminal; and a communication device configured to transmit information about the application to a second terminal and connection information regarding the second terminal to the at least one external device, wherein the connection information is information for establishing a connection with the second terminal by the at least one external device, and wherein the information about the application is information applied by the second terminal to execute the application with the at least one external device.

According to another aspect of the exemplary embodiments, there is provided a second terminal including: a communication device configured to receive information about an application being executed on a first terminal and connection information regarding at least one external device connected to the first terminal and for establishing a connection with respect to the at least one external device based on the connection information; and a controller configured to execute the application with the at least one external device connected to the second terminal based on the information about the application.

BRIEF DESCRIPTION OF THE DRAWINGS

The above and other exemplary embodiments will become more apparent by describing in detail exemplary embodiments thereof with reference to the attached drawings in which:

FIG. 5 is a flowchart illustrating a method of executing an application, according to another exemplary embodiment;

FIGS. 7A and 7B are schematic views illustrating shifting of an instrument playing service, according to an exemplary embodiment;

FIGS. 8A, 8B, 9A, 9B, and 9C are schematic views illustrating shifting of a video game service, according to an exemplary embodiment;

FIG. 11 is a flowchart illustrating a method of automatically connecting a first terminal to an external device related to a predetermined application, according to an exemplary embodiment;

FIGS. 13A-13E are schematic views for explaining a method of automatically connecting a first terminal to an external device related to a video replay application, according to an exemplary embodiment;

FIGS. 14A-14D are schematic views for explaining a method of automatically connecting a first terminal to an external device related to an instrument playing application, according to an exemplary embodiment;

FIGS. 15 A and B are schematic views for explaining a method of automatically connecting a first terminal to an external device, according to an exemplary embodiment;

DETAILED DESCRIPTION OF EXEMPLARY EMBODIMENTS

Figure 1:
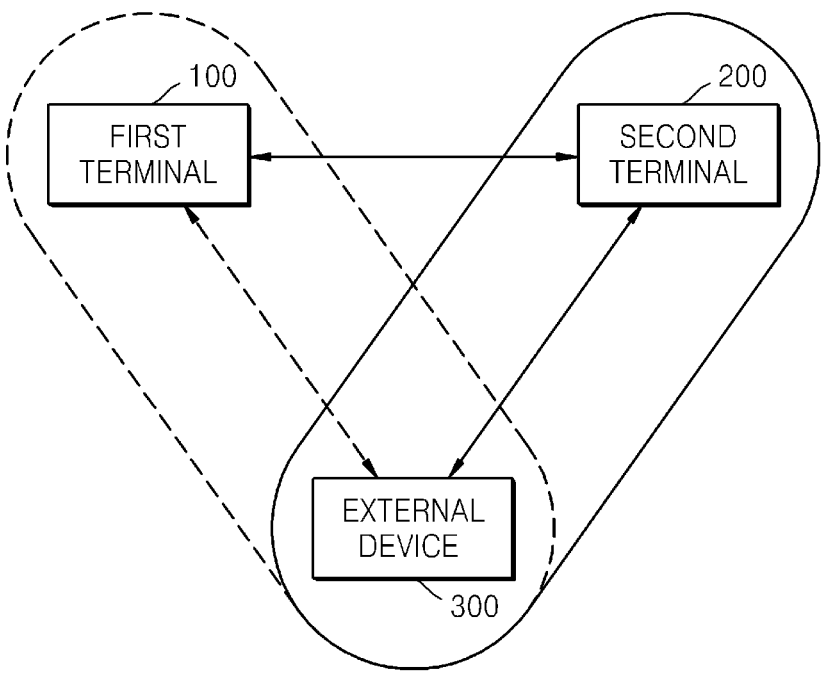
FIG. 1 is a schematic view illustrating an application executing system according to an exemplary embodiment.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the exemplary embodiments. Thus, the terms used herein have to be defined based on the meaning of the terms together with the description throughout the specification.

Also, it will be further understood that the terms "comprises" or "includes" when used in this specification, specify the presence of stated elements and/or operations, but do not preclude the presence or addition of one or more other elements or operations. In the following description, terms such as "unit" and "module" indicate a unit for processing at least one function or operation, wherein the unit and the block may be embodied as hardware or software or may be embodied by combining hardware and software.

Throughout the specification, the term "application" means a set of a series of computer programs designed to execute particular tasks. The application described in the specification may vary. That is, examples of the application may include, without limitation, a game application, an instrument playing application, a video replay application, a map application, a broadcasting application, a sports-supporting application, and a payment application.

One or more exemplary embodiments will now be described more fully with reference to the accompanying drawings, in which exemplary embodiments are shown. The exemplary embodiments may, however, be embodied in many different forms, and should not be construed as being limited to the exemplary embodiments set forth herein; rather, these exemplary embodiments are provided so that this disclosure will be thorough and complete, and will fully convey the concept of the exemplary embodiments to those of ordinary skill in the art. In the following description, well-known functions or constructions are not described in detail since they would obscure the exemplary embodiments with unnecessary detail, and like reference numerals in the drawings denote like or similar elements throughout the specification.

Expressions such as "at least one of," when preceding a list of elements, modify the entire list of elements and do not modify the individual elements of the list.

FIG. 1 is a schematic view illustrating an application executing system according to an exemplary embodiment.

As illustrated in FIG. 1, the application executing system may include a first terminal 100, a second terminal 200, and an external device 300. However, not all of the illustrated elements are essential. An application executing system may be formed of more or less elements than the illustrated ones. For example, the application executing system may further include an external server to connect the first terminal 100 and the second terminal 200.

The first terminal 100 may be connected to the external device 300 in a wired or wireless manner. In detail, according to the current exemplary embodiment, the first terminal 100 may be connected to the external device 300 via short-range wireless communication. Examples of the short-range wireless communication include, without limitation, Wireless Fidelity (Wi-Fi), Near Field Communication (NFC), Bluetooth, Bluetooth Low Energy (BLE), Zigbee, Wi-Fi Direct (WFD), and Ultra Wideband (UWB).

The first terminal 100 may control the external device 300 by executing an application related to the external device 300. Also, when an application is executed, the first terminal 100 may automatically search for the external device 300 related to the application and connect to the external device 300.

The first terminal 100 according to the current exemplary embodiment may be implemented in various forms. For example, the first terminal 100 may be a mobile phone, a smartphone, a laptop computer, a tablet personal computer (PC), an e-book terminal, a digital broadcasting terminal, a personal digital assistant (PDA), a portable multimedia player (PMP), a navigation device, a smart TV, or a consumer electronics (CE) device (e.g., a refrigerator or an air-conditioner having a display panel).

The second terminal 200 may communicate with the first terminal 100 or an external server or the like via a network. A network according to the current exemplary embodiment may be implemented by wireless communication technology such as Wi-Fi, home radio frequency (RF), Bluetooth, NFC, high-rate wireless personal area network (HR WPAN), UWB, low-rate (LR) WPAN, or IEEE 1394.

The second terminal 200 may be automatically connected to the external device 300 connected to the first terminal 100 when a service that is being provided on the first terminal 100 is shifted to the second terminal 200. That is, according to the current exemplary embodiment, the second terminal 200 may also be connected to the external device 300 via short-range wireless communication.

The second terminal 200 according to the current exemplary embodiment may have various forms. For example, the second terminal 200 may be a smart TV, an Internet protocol television (IPTV), a digital television (DTV), a computer, a laptop computer, an e-book terminal, a tablet PC, a mobile phone, a digital broadcasting terminal, a PDA, a PMP, a navigation device, a CE device (e.g., a refrigerator or an air-conditioner having a display panel), or a kiosk, but is not limited thereto.

The external device 300 may be a device related to an application that is executed on the first terminal 100 or the second terminal 200. According to the exemplary embodiments, a single external device 300 or a plurality of external devices 300 may be included.

The external device 300 may be connected to the first terminal 100 or the second terminal 200 via short-range wireless communication. The external device 300 may receive a control command from the first terminal 100 or the second terminal 200 via short-range wireless communication, or may transmit input or output data to the first terminal 100 or the second terminal via short-range wireless communication.

The external device 300 may include a Bluetooth low energy (BLE) module. The external device 300 may receive a connection request from the first terminal 100 to activate a Wi-Fi module or a Bluetooth module. Also, the external device 300 may broadcast authentication information or connection information via a BLE.

The external device 300 may have various forms. The external device 300 may include, for example, an input device, an output device, and a controller. Examples of the external device 300 may include a microphone, a speaker, a pedal, a joystick, an instrument (e.g., piano, organ, electronic keyboard, guitar, violin, or cello), a game manipulation device, a doll, a medical instrument, and exercise equipment.

Hereinafter, a method of executing an application by using the first terminal 100 or the second terminal 200 with the external device 300 will be described in detail.

Figure 2:
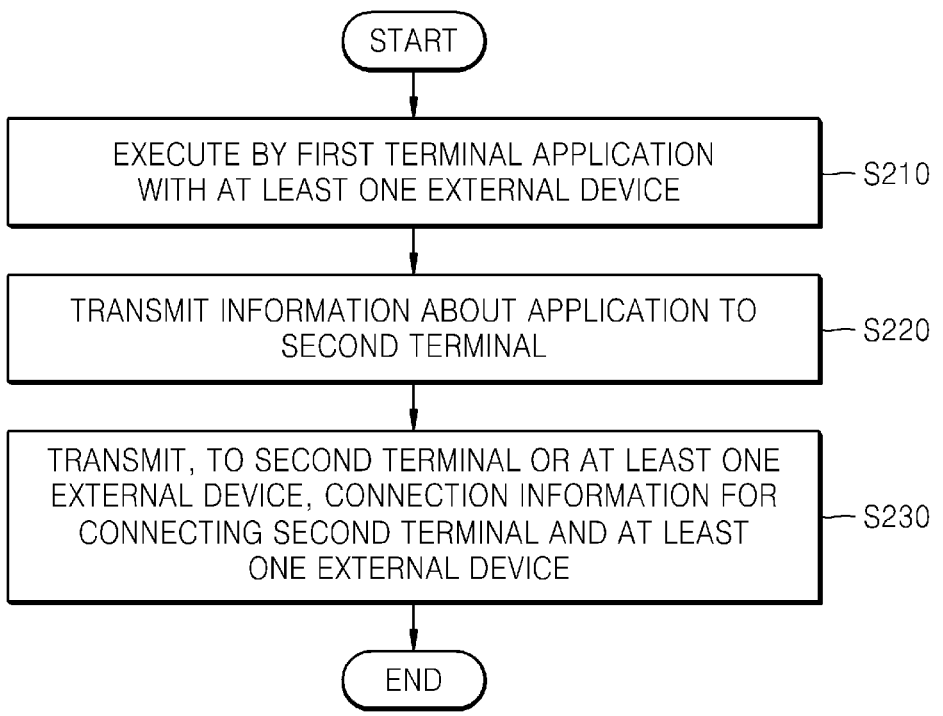
FIG. 2 is a flowchart illustrating a method of executing an application by a first terminal, according to an exemplary embodiment.

FIG. 2 is a flowchart illustrating a method of executing an application by the first terminal 100, according to an exemplary embodiment.

In operation 210, the first terminal 100 may execute an application with at least one external device 300 connected to the first terminal 100. For example, the first terminal 100 may perform short-range wireless communication (e.g., Wi-Fi, Bluetooth, or the like) with the at least one external device 300 related to a predetermined application to thereby execute the predetermined application.

An application according to an exemplary embodiment may vary as a game application, an instrument playing application, a video replay application, a map application, a broadcasting application, an exercise-supporting application, and a payment application.

In operation 220, the first terminal 100 may transmit information about an application to the second terminal 200. The information about an application refers to information that is used by the second terminal 200 in executing an application working along with the at least one external device 300.

For example, in the information about an application, identification information of an application, execution status information of an application, and information about an external device related to an application may be included. The identification information of an application distinguishes a predetermined application from other applications, and may be, for example, identification (ID) of an application, a name of an application, or a classification code for an application.

The execution status information of an application refers to information about a state in which the application is being executed on the first terminal 100 at the time when the information about an application is transmitted to the second terminal 200. For example, in an example of a game, a process level (e.g., Level 3) may be included as execution status information, and in an example of a video, a replay position may be included as execution status information.

The information about an external device related to an application refers to information about an external device used during execution of the application. For example, in the information about an external device related to an application, the number of external devices related to an application, types of an external device, a name of an external device, or a device ID of an external device may be included. However, these types of information are only exemplary, and other types of information may be included.

According to the current exemplary embodiment, if an application is not previously installed in the second terminal 200, the first terminal 100 may receive a request for providing an application, from the second terminal 200, and transmit the requested application to the second terminal 200.

In operation 230, the first terminal 100 may transmit, to the second terminal 200 or the at least one external device 300, connection information for connecting the second terminal 200 to the at least one external device 300.

For example, according to an exemplary embodiment, the first terminal 100 may transmit, to the second terminal 200, connection information regarding the at least one external device 300. The connection information regarding the external device 300 is information for establishing, by the second terminal 200, a connection with respect to the at least one external device 300.

For example, the connection information regarding the at least one external device 300 may be a communication method of the at least one external device 300, connection information of a wireless local area network (WLAN) used by the at least one external device 300 (e.g., a service set identifier (SSID), an internet protocol (IP) address, a media access control (MAC) address, a channel number, a security key, or the like), a MAC address of the at least one external device 300, a Bluetooth (BT) address of the at least one external device 300, a product name of the at least one external device 300, and profile information of the at least one external device 300. Examples of the communication method include WLAN (ad hoc mode or infrastructure mode), Bluetooth, Zigbee, WFD, and UWB.

The first terminal 100 may transmit, to the second terminal 200, connection information of some of a plurality of external devices connected to the first terminal 100. In this case, some of a plurality of external devices may be connected to the first terminal 100, and other external devices may be connected to the second terminal 200.

For example, when the first terminal 100 transmits information about a plurality of external devices related to an application, to the second terminal 200, the second terminal 200 may check the information about a plurality of external devices related to an application, and transmit, to the first terminal 100, information on connectable or unconnectable external devices. For example, if the second terminal 200 does not support a Bluetooth function, the second terminal 200 may transmit, to the first terminal 100, information indicating that Bluetooth-enabled external devices are not connectable.

Here, the first terminal 100 may transmit, to the second terminal 200, information about external devices that are connectable to the second terminal 200, and may maintain connection of the rest of external devices that are unconnectable to the second terminal 200. The first terminal 100 may function as a gateway between the rest of the external devices whose connection is maintained and the second terminal 200.

According to another exemplary embodiment, the first terminal 100 may transmit, to the at least one external device 300, connection information regarding the second terminal 200.

The connection information regarding the second terminal 200 may be information needed for the at least one external device 300 to be connected to the second terminal 200. Examples of the connection information regarding the second terminal 200 include a communication method of the second terminal 200, connection information of a WLAN used by the second terminal 200 (e.g., an SSID, an IP address, a MAC address, a channel number, a security key, or the like), a MAC address of the second terminal 200, a Bluetooth (BT) address of the second terminal 200, a product name of the second terminal 200, and profile information of the second terminal 200. Examples of the communication method include WLAN (ad hoc mode or infrastructure mode), Bluetooth, Zigbee, WFD, and UWB.

The first terminal 100 may transmit connection information regarding the second terminal 200 to some of a plurality of external devices that are connected to the first terminal 100. For example, when the second terminal 200 does not support a Bluetooth function, the first terminal 100 may not transmit connection information regarding the second terminal 200 to a Bluetooth-enabled external device but only to an external device connected via Wi-Fi. Also, the first terminal 100 may transmit connection information regarding the second terminal 200 to some of the external devices 300 upon receiving a user input.

Figure 3:
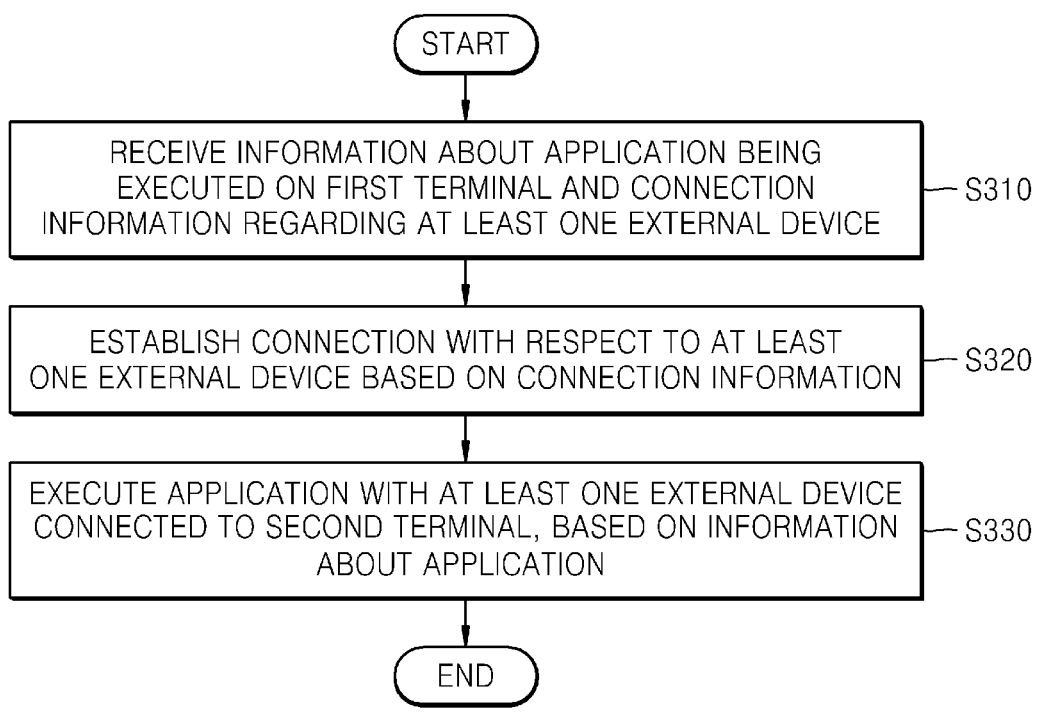
FIG. 3 is a flowchart illustrating a method of executing an application by a second terminal, according to an exemplary embodiment.

FIG. 3 is a flowchart illustrating a method of executing an application by the second terminal 200, according to an exemplary embodiment.

In operation 310, the second terminal 200 may receive information about an application that is being executed on the first terminal 100, and receive connection information regarding the at least one external device 300 that is connected to the first terminal 100. According to an exemplary embodiment, the second terminal 200 may receive information about an application being executed on the first terminal 100 and connection information regarding the at least one external device 300 that is connected to the first terminal 100, from the first terminal 100 or an external server (not shown).

As described above, identification information of an application, execution status information of an application and information about an external device related to an application may be included in information about an application. The connection information regarding the at least one external device 300 may include connection information of a WLAN used by the at least one external device 300 (e.g., an SSID, an IP address, a MAC address, a channel number, a security key, or the like), a MAC address of the at least one external device 300, a Bluetooth (BT) address of the at least one external device 300, a product name of the at least one external device 300, or profile information of the at least one external device 300.

According to an exemplary embodiment, the second terminal 200 may receive connection information of some of a plurality of external devices 300 connected to the first terminal 100.

In operation 320, the second terminal 200 may establish a connection with respect to the at least one external device 300 based on the connection information regarding the at least one external device 300.

For example, the second terminal 200 may connect to the at least one external device 300 via Wi-Fi (WLAN) based on the connection information of a WLAN used by the at least one external device 300 (e.g., an SSID, an IP address, a MAC address, a channel number, a security key or the like). Also, the second terminal 200 may communicate with the at least one external device 300 via Bluetooth based on, for example, a BT address or a product name of the at least one external device 300.

When the second terminal 200 receives connection information regarding some of a plurality of external devices connected to the first terminal 100, the second terminal 200 may establish a connection only with respect to the some of the plurality of external devices.

In operation 330, the second terminal 200 may execute an application with the at least one external device 300 connected to the second terminal 200 based on information about an application.

According to the current exemplary embodiment, when an application is not executed on the second terminal 200, the second terminal 200 may receive an application from an external server or the first terminal 100 based on identification information of an application included in the information about an application, and install the application.

When an application is already installed in the second terminal 200, the second terminal 200 may search for an application that is previously installed in the second terminal 200 and display the same based on identification information of an application included in information about an application.

According to the current exemplary embodiment, the second terminal 200 may execute an application with the at least one external device 300 in the same state as the state in which the application is executed on the first terminal 100 based on execution status information of the application included in the information about an application. For example, when a game "abc" is completed up to Level 3 on the first terminal 100, and Level 4 is about to start, the second terminal 200 may start execution of the game "abc" from Level 4 based on the execution status information of the application of the first terminal 100.

According to the current exemplary embodiment, if the at least one external device 300 is not registered in the second terminal 200, the second terminal 200 may receive registration information of the at least one external device 300 from the first terminal 100 and register the external device in the second terminal 200. In the registration information of the external device 300, identification information of the at least one external device 300, authentication information of the at least one external device 300, and application information of the at least one external device 300 (e.g., identification information of an application related to the at least one external device 300 or link information of an application) may be included.

Hereinafter, a method in which a service providing terminal is changed so that an external device connected to the service providing terminal is automatically connected to a new terminal, and the new terminal provides a service with the external device will be described in detail with reference to FIGS. 4 and 5.

Figure 4:
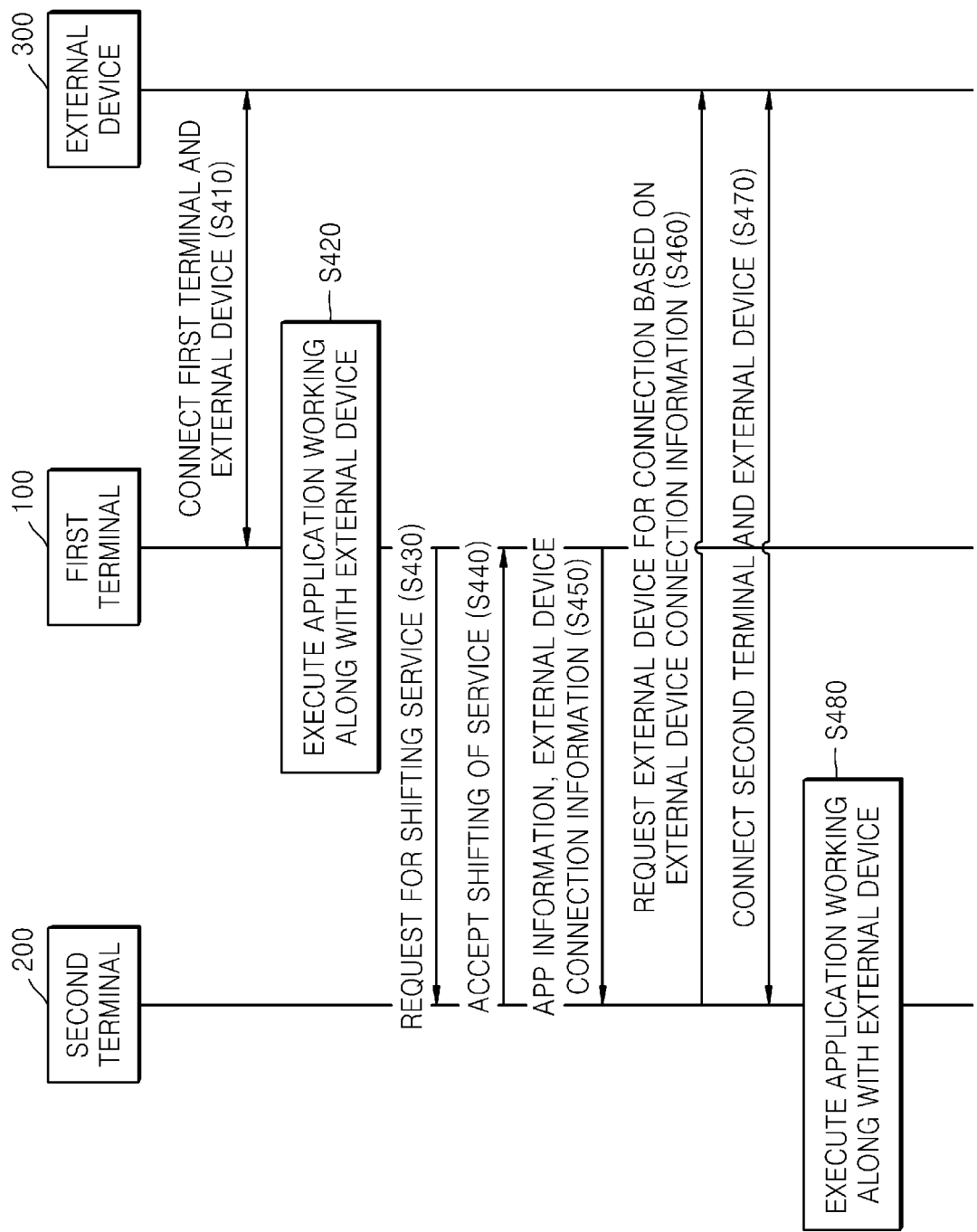
FIG. 4 is a flowchart illustrating a method of executing an application, according to an exemplary embodiment.

FIG. 4 is a flowchart illustrating a method of executing an application according to an exemplary embodiment.

In operation S410, the first terminal 100 and the external device 300 may be connected via a network. Examples of the network may be wireless communication techniques such as Wi-Fi, HomeRF, Bluetooth, NFC, HR WPAN, UWB, LR WPAN, and IEEE 1394.

In operation S420, the first terminal 100 may execute an application with the external device 300. In operation S430, the first terminal 100 may transmit, to the second terminal 200, a request for shifting a service related to an application that is being executed.

According to the current exemplary embodiment, when a distance between the first terminal 100 and the second terminal 200 is within a radius of short-range wireless communication, the first terminal 100 may transmit, to the second terminal 200 via NFC, a request for shifting a service. For example, when a user touches the first terminal 100 on the second terminal 200, the first terminal 100 may transmit, to the second terminal 200 via NFC, the request for shifting the service.

According to the current exemplary embodiment, the first terminal 100 may transmit the request for shifting the service to the second terminal 200 based on a direction of a touch input received from the user. For example, while an application is being executed, when a user of the first terminal 100 inputs a touch gesture for dragging from a first direction to a second direction, the first terminal 100 may transmit a request for shifting a service, to a terminal disposed in the second direction.

According to the current exemplary embodiment, the first terminal 100 may also transmit, to the second terminal 200, a request for shifting a service based on a predetermined motion input or a predetermined key input of a user who requests shifting of the service.

In operation S440, the first terminal 100 may receive an acceptance message regarding the request for shifting the service, from the second terminal 200.

In operation S450, the first terminal 100 may transmit, to the second terminal 200, information about an application being executed and connection information of the least one external device 300 connected to the first terminal 100. According to the current exemplary embodiment, the first terminal 100 may transmit, to the second terminal 200, information about the application and connection information of the at least one external device 300 together with the request for shifting the service or separately from the request.

According to the current exemplary embodiment, the first terminal 100 may transmit information about the second terminal 200 (e.g., a device name or MAC address) to the external device 300.

In operation S460, the second terminal 200 may request the external device 300 for connection based on the connection information received from the first terminal 100. According to the current exemplary embodiment, the external device 300 may respond to the connection request of the second terminal 200 based on the information about the second terminal 200 received from the first terminal 100.

In operation S470, the second terminal 200 and the external device 300 may be connected via NFC. In operation S480, the second terminal 200 may execute an application with the external device 300 based on the information about the application received from the first terminal 100.

If the application is not previously installed in the second terminal 200, the second terminal 200 may request the first terminal 100 for the application. The second terminal 200 may receive the application from the first terminal 100 or may receive link information about the application. Link information refers to connection information regarding a website on which the application is located. For example, a uniform resource locator (URL) is link information. When link information about the application is received, the second terminal 200 may receive the application from an external server based on the link information about the application and install the application.

FIG. 5 is a flowchart illustrating a method of executing an application according to another exemplary embodiment.

In operation S510, the first terminal 100 and the external device 300 may be connected via short-range wireless communication. In operation 520, the first terminal 100 may execute the application together with the at least one external device 300 connected to the first terminal 100.

In operation S530, the first terminal 100 may transmit, to the second terminal 200, a request for shifting a service related to the application being executed. According to the current exemplary embodiment, the first terminal 100 may transmit to the second terminal 200 information about the application being executed (e.g., identification of the application, information about an external device related to the application, or execution status information of the application) together with the request for shifting the service. Alternatively, the first terminal 100 may transmit to the second terminal 200 information about the application being executed, separately from the request for shifting a service.

In operation S540, the first terminal 100 may receive an acceptance message regarding the request for shifting the service, from the second terminal 200. As operations S510 through S540 respectively correspond to operations S410 through S440 of FIG. 4, detailed descriptions thereof will be omitted here.

In operation S550, the first terminal 100 may receive connection information regarding the second terminal 200 from the second terminal 200. According to the current exemplary embodiment, the first terminal 100 may receive connection information regarding the second terminal 200 together with an acceptance message with respect to the request for shifting the service.

The connection information regarding the second terminal 200 may be a communication method of the second terminal 200, connection information of a WLAN used by the second terminal 200 (e.g., an SSID, an IP address, a MAC address, a channel number, a security key, or the like), a MAC address of the second terminal 200, a Bluetooth (BT) address of the second terminal 200, a product name of the second terminal 200, or profile information of the second terminal 200.

In operation S560, the first terminal 100 may transmit the connection information regarding the second terminal 200 to the at least one external device 300. In operation S570, the external device 300 may request the second terminal 200 for connection, based on the connection information regarding the second terminal 200. The second terminal 200 may respond to the request for connection from the external device 300 based on information about an external device related to an application received from the first terminal 100.

In operation S580, the second terminal 200 and the external device 300 may be connected via short-range wireless communication. The short-range wireless communication may be at least one of Wi-Fi, Bluetooth, WFD, UWB, and Zigbee.

In operation 590, the second terminal 200 may execute an application working along with the external device 200 based on information about an application received from the first terminal 100. The first terminal 100 may end execution of an application that is being executed on the first terminal 100. That is, when a message notifying that connection between the second terminal 200 and the external device 300 is completed, is received from the second terminal 200 or the external device 300, the first terminal 100 may end the application that is being executed.

According to another exemplary embodiment, the first terminal 100 may not end the application being executed but may provide another service (or function) that is different from a service (or function) provided by the second terminal 200 by using the application.

Figure 6A:
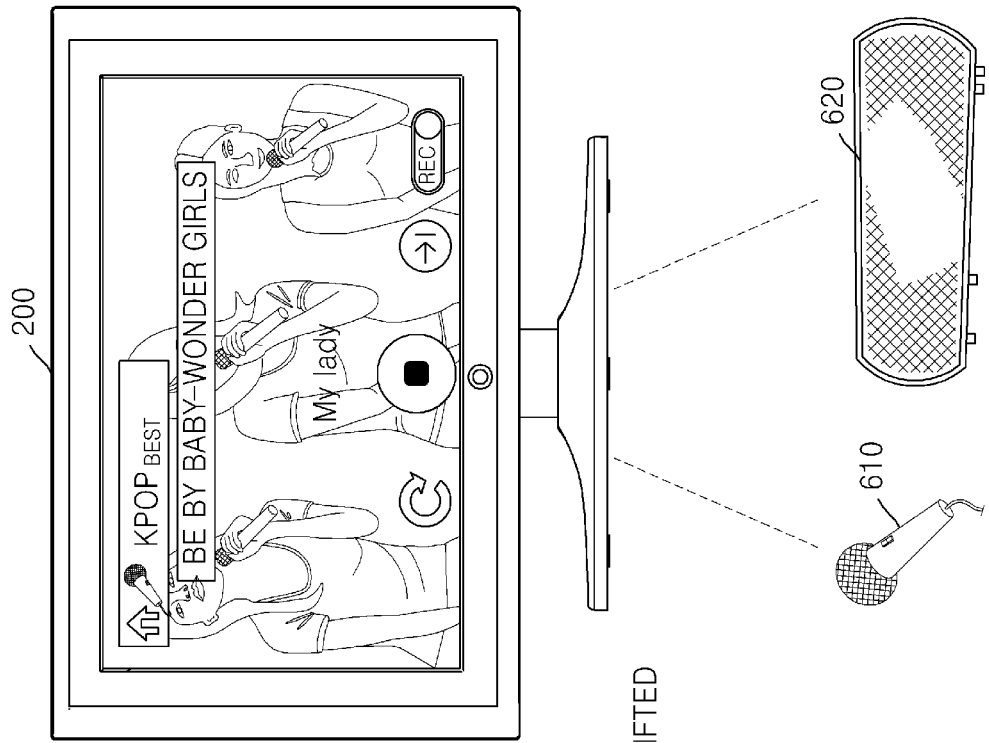
FIGS. 6A and 6B are schematic views illustrating shifting of a music providing service, according to an exemplary embodiment.
Figure 6B:
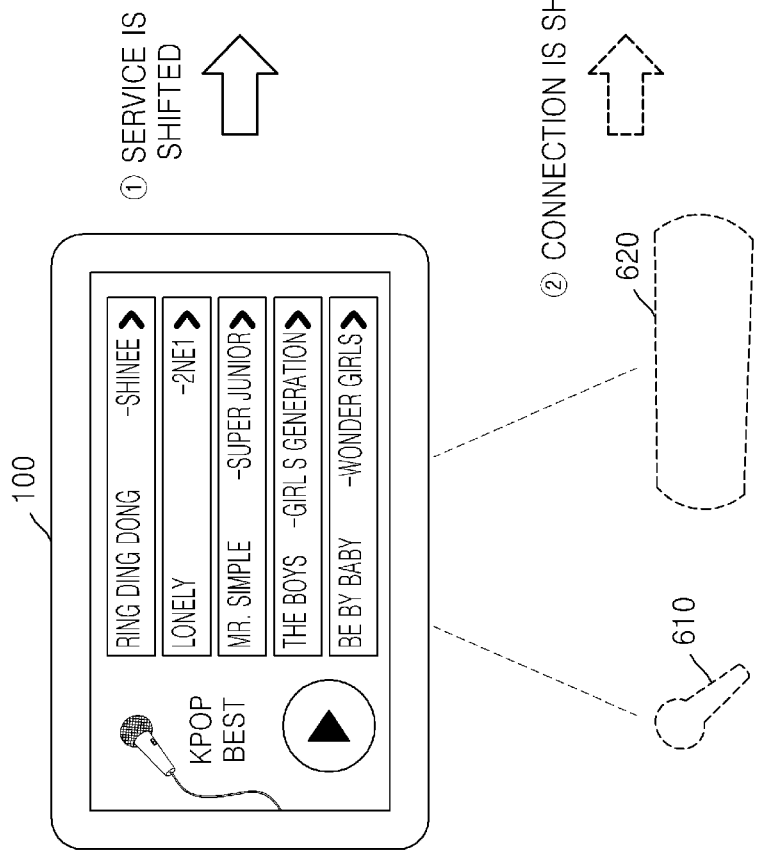

FIGS. 6A and 6B are a schematic views illustrating shifting of a music providing service, according to an exemplary embodiment.

As illustrated in FIG. 6A, the first terminal 100, which may be a tablet PC, may execute a karaoke application to provide a karaoke service. The first terminal 100 may execute a karaoke application by using a microphone 610 and a speaker 620 connected thereto via short-range wireless communication. For example, the first terminal 100 may provide song lyrics on a display and output sound that is input via the microphone 610 through the speaker 620.

As illustrated in FIG. 6B, upon receiving a user input, the karaoke service that is being provided on the first terminal 100 may be shifted to the second terminal 200 which in this case is a smart TV. The first terminal 100 may provide information about the karaoke application to the second terminal 200. Also, the first terminal 100 may provide the second terminal 200 with connection information regarding the microphone 610 and the speaker 620. In this case, the second terminal 200 may be connected to the microphone 610 and the speaker 620 based on the connection information regarding the microphone 610 and the speaker 620.

For example, when the microphone 610 and the speaker 620 support Bluetooth communication, the first terminal 100 may transmit Bluetooth connection information of the microphone 610 and the speaker 620 (e.g., Bluetooth addresses or a product name) to the second terminal 200, and the second terminal 200 may automatically establish a Bluetooth communication connection with respect to the microphone 610 and the speaker 620.

Also, the first terminal 100 may transmit information about an access point (AP) which the microphone 610 and the speaker 620 have connected (e.g., a MAC address, an SSID, or a channel number), to the second terminal 200, so that the second terminal 200 and the microphone 610 and the speaker 620 are connected via Wi-Fi.

According to another exemplary embodiment, the first terminal 100 may transmit to the microphone 610 and the speaker 620 connection information regarding the second terminal 200 so that the microphone 610 and the speaker 620 may establish communication connection with respect to the second terminal 200.

Accordingly, according to the current exemplary embodiment, as a karaoke service has been shifted from the tablet PC to the smart TV, the microphone 610 and the speaker 620 connected to the tablet PC are automatically connected to the smart TV so that the smart TV may provide the karaoke service with the microphone 610 and the speaker 620.

FIGS. 7A and 7B are schematic views illustrating shifting of an instrument playing service, according to an exemplary embodiment.

As illustrated in FIG. 7A, the first terminal 100 which may be a tablet PC may execute an instrument playing application to provide an instrument playing service. The first terminal 100 may execute an instrument playing application with a piano keyboard 710 and a guitar 720 that are connected to the first terminal via short-range wireless communication.

As illustrated in FIG. 7B, upon receiving a user request, the instrument playing service being provided on the first terminal, may be shifted from the first terminal 100 to the second terminal 200 which may be a PC. The first terminal 100 may provide information about the instrument playing application, to the second terminal 200. The first terminal 100 may provide the second terminal 200 with connection information regarding the piano keyboard 710 and the guitar 720. Alternatively, the first terminal 100 may provide connection information with respect to the second terminal 200 which may be a PC, to the piano keyboard 710 and the guitar 720.

As the instrument playing service is shifted from the first terminal 100 to the second terminal 200, the second terminal 200 and the piano keyboard 710 and the guitar 720 are automatically connected so as to execute the instrument playing application.

FIGS. 8A and 8B are schematic views illustrating shifting of a video game service, according to an exemplary embodiment.

As illustrated in FIG. 8A, the first terminal 100 may execute a racing game application with a steering wheel 810 connected to the first terminal 100 to provide a game service.

As illustrated in FIG. 8B, upon receiving a user request, the game service being provided on the first terminal 100 may be shifted to the second terminal 200. The first terminal 100 may provide information related to the racing game application, to the second terminal 200. The first terminal 100 may transmit connection information regarding the steering wheel 810 to the second terminal 200 or connection information regarding the second terminal 200 to the steering wheel 810 so that the second terminal 200 and the steering wheel 810 are automatically connected.

The second terminal 200 may execute the same racing game application at the same game level as the application being executed on the first terminal 100 based on information about the racing game application received from the first terminal 100.

When the racing game application is executed on the second terminal 200, the first terminal 100 may execute another application related to the racing game application. For example, the first terminal 100 may execute a map application showing a current position of a racing car or a traveling section thereof.

FIGS. 9A to 9C are schematic views illustrating shifting of a video game service, according to another exemplary embodiment.

As illustrated in FIG. 9A, the first terminal 100 may be connected to an electronic gun 910 via short-range wireless communication. In this case, as illustrated in FIG. 9B, the first terminal 100 may execute a shooting game application (a game aimed at eliminating an enemy or an obstacle by shooting a gun or firing a weapon) with the electronic gun 910 connected thereto via short-range wireless communication to thereby provide a shooting game service.

As illustrated in FIG. 9C, upon receiving a user request, the shooting game service being provided on the first terminal 100 which is a mobile phone may be shifted to the second terminal 200 which is a smart TV. The first terminal 100 may provide information related to the shooting game application. The first terminal 100 may transmit connection information regarding the electronic gun 910, to the second terminal 200 or provide connection information regarding the second terminal 200, to the electronic gun 910. Accordingly, as the shooting game service is shifted from the first terminal 100 to the second terminal 200, a short-range wireless communication connection of the electronic gun 910 may be automatically changed from the first terminal 100 to the second terminal 200.

The second terminal 200 may execute the same shooting game application at the same game level as the application being executed on the first terminal 100 based on information related to the shooting game application received from the first terminal 100.

When the shooting game application is executed on the second terminal 200, the first terminal 100 may execute another application related to the shooting game application. For example, the first terminal 100 may execute an application for displaying radar.

According to another exemplary embodiment, when the shooting game application is executed on the second terminal 200, the first terminal 100 may display radar by modifying an execution status of the shooting game application that has been executed before.

Figure 10:
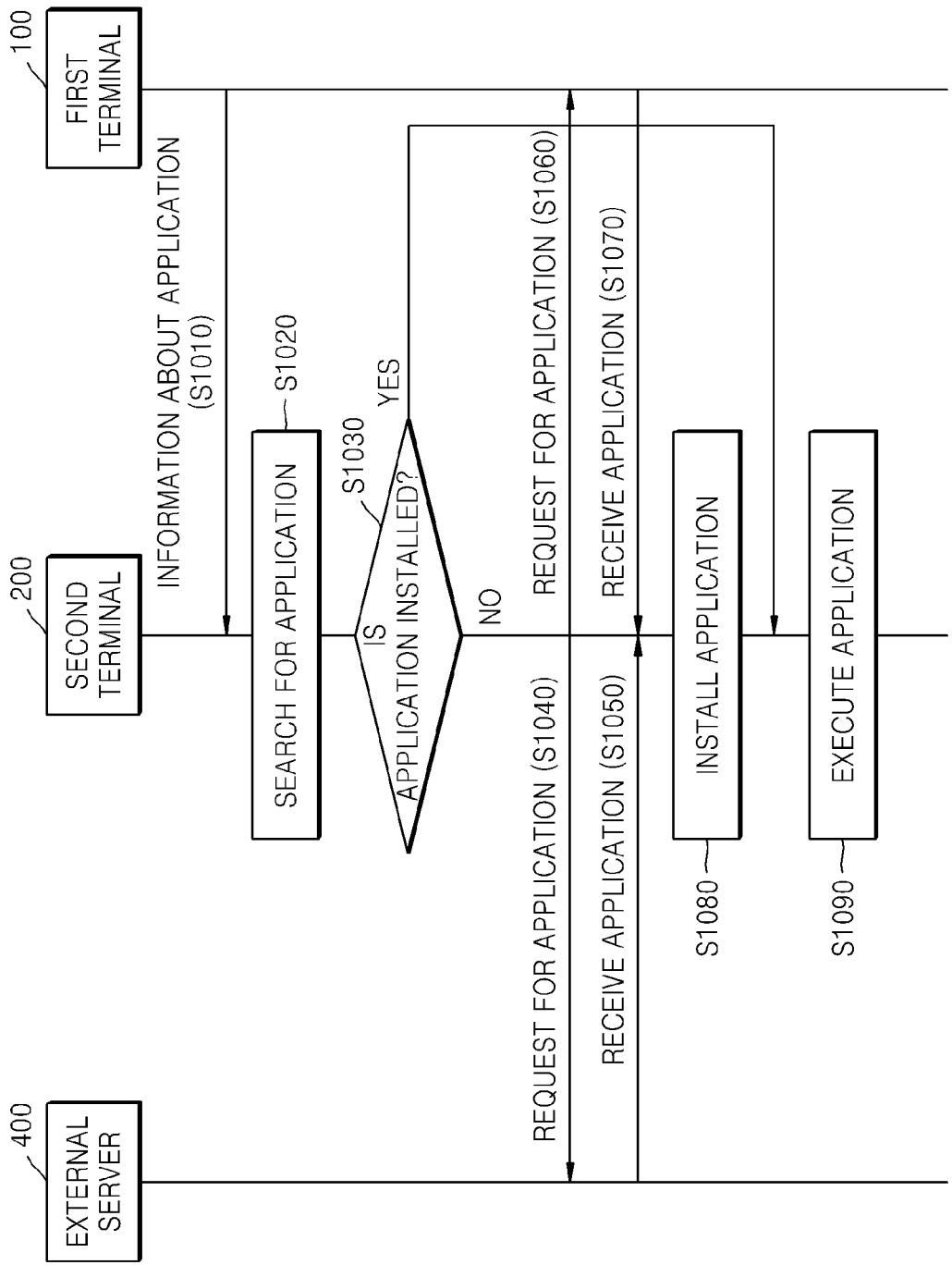
FIG. 10 is a flowchart illustrating a method of installing an application by a second terminal, according to an exemplary embodiment.

That is, the first terminal 100 may execute an application that is different from an application that is being executed on the second terminal 200 or may provide an additional function while executing the same application at the same time FIG. 10 is a flowchart illustrating a method of installing an application by the second terminal 200, according to an exemplary embodiment.

In operation S1010, the second terminal 200 may receive information about an application (e.g., identification information of an application, information about an external device related to an application, or execution status information of an application) from the first terminal 100. In operation S1020, the second terminal 200 may search a memory for an application based on identification information of an application.

In operation S1030, the second terminal 200 may determine whether an application is installed in the second terminal, based on a result of the searching. When an application is previously installed in the second terminal 200, the second terminal 200 may display the application on a screen or may automatically execute the application.

In operation S1040 or operation S1060, when an application is not previously installed in the second terminal 200, the second terminal 200 may request an external server 400 or the first terminal 100 for the application.

In operation S1050, the second terminal 200 may receive an application from the external server 400. Alternatively, in operation 1070, the second terminal 200 may receive, from the first terminal 100, an application or link information (e.g., URL information) about an application. When link information is received, the second terminal 200 may receive an application from an application providing server based on the link information. The application providing server may be the external server 400.

In operation S1080, the second terminal 200 may install the application. In operation S1090, the second terminal 200 may execute the application with the at least one external device 300 connected to the second terminal 200.

FIG. 11 is a flowchart illustrating a method of automatically connecting a first terminal to an external device related to a predetermined application, according to an exemplary embodiment.

In operation S1110, the first terminal 100 may receive a selection of an application from a user. A selection of an application according to an exemplary embodiment may be selected by a user touching a predetermined icon, pressing a predetermined key, or connecting an external device connected to a predetermined application, to the first terminal 100, in a wired or wireless manner.

In operation S1120, the first terminal 100 may search for an external device related to the selected application. According to the current exemplary embodiment, when the first terminal 100 registers the external device 300, identification information of the external device 300 and information about an application related to the external device 300 are matched. Thus, the first terminal 100 may search a database for the external device 300 that matches the selected application.

In operation S1130, the first terminal 100 may request an external device 300-1 that supports a Wi-Fi communication function for connection, via BLE. According to the current exemplary embodiment, the first terminal 100 may request connection by transmitting to the external device 300-1 information of an AP to which the first terminal 100 has connected, such as a MAC address, an SSID, a channel number, or a security key.

In operation S1140, the external device 300-1 may activate a Wi-Fi module. In operation S1150, the external device 300-1 and the first terminal 100 may be connected via short-range wireless communication as the external device 300-1 accesses an AP based on information such as a MAC address, an SSID, a channel number or a security key.

In operation S1160, the first terminal 100 may request an external device 300-2 that supports a Bluetooth communication function for Bluetooth connection, via BLE. According to an exemplary embodiment, when the external device 300-2 and the first terminal 100 are paired, the first terminal 100 may request Bluetooth connection by transmitting a link key to the external device 300-2. "Pairing" refers to a state in which a communication connection between devices that support a Bluetooth function is granted.

When the external device 300-2 and the first terminal 100 are not paired, the first terminal 100 and the external device 300-2 may conduct a pairing procedure by transmitting or receiving a Bluetooth address, a product name, profile information, or personal ID information (e.g., a PIN code).

In operation S1170, the external device 300-2 may activate a Bluetooth module. Also, the first terminal 100 and the external device 300-2 may be connected via Bluetooth communication as the external device 300-2 conducts authentication with respect to a link key received from the first terminal 100.

According to the current exemplary embodiment, when a user selects a predetermined application, the first terminal 100 may automatically search for at least one external device 300 related to the selected application and connect to the same.

Figure 12A:
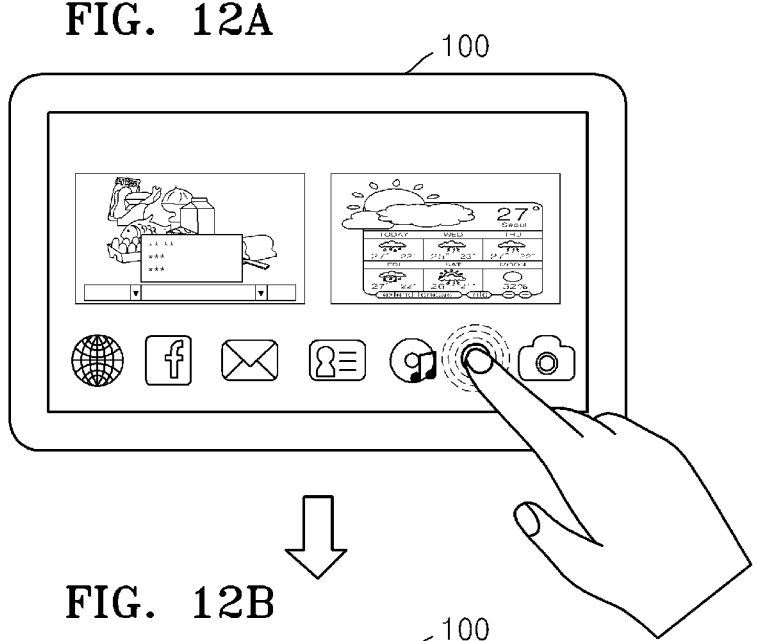
FIGS. 12A, 12B, and 12C are schematic views for explaining a method of automatically connecting a first terminal to an external device related to a karaoke application, according to an exemplary embodiment.
Figure 12B:
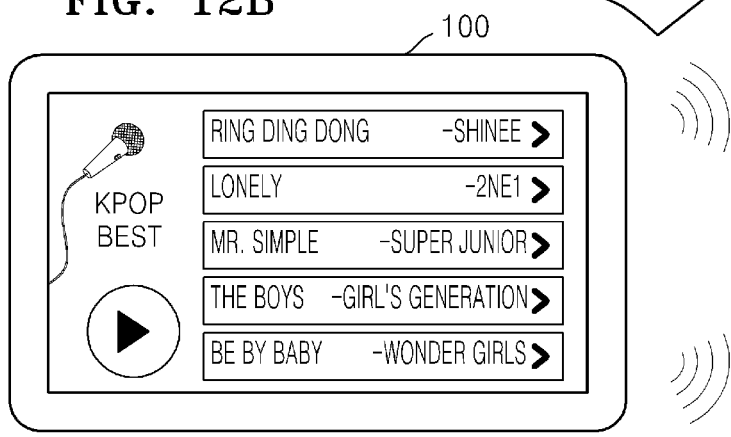
Figure 12C:
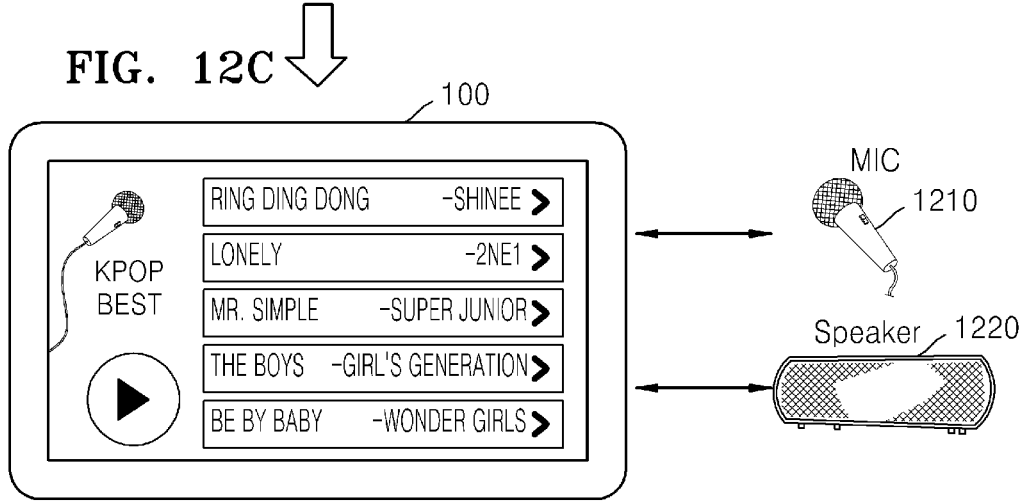

FIGS. 12A to 12C are schematic views for explaining a method of automatically connecting the first terminal 100 to an external device related to a karaoke application, according to an exemplary embodiment.

As illustrated in FIG. 12A, the first terminal 100 may receive a selection of a karaoke application from a user.

As illustrated in FIG. 12B, the first terminal 100 may search for at least one external device related to a karaoke application. For example, the first terminal 100 is a device related to a karaoke application and may search for an external device such as a microphone 1210 and a speaker 1220 that is related to the karaoke application.

As illustrated in FIG. 12C, the first terminal 100 may transmit to each of the microphone 1210 and the speaker 1220, Wi-Fi connection information (e.g., a MAC address of an AP, an SSID, a channel number, a security key, or the like) or Bluetooth connection information (e.g., a link key) so as to be connected to each of the microphone 1210 and the speaker 1220 via short-range wireless communication.

FIGS. 13A to 13E are schematic views for explaining a method of automatically connecting the first terminal 100 to an external device related to a video replay application, according to an exemplary embodiment.

As illustrated in FIG. 13A, the first terminal 100 may receive from a user a selection of an application for replaying an animation "XYZ".

As illustrated in FIG. 13B, the first terminal 100 may search for, as an external device related to the selected application, a character doll A 1310 and a character doll B 1320.

As illustrated in FIG. 13C, the first terminal 100 may transmit to each of the character doll A 1310 and the character doll B 1320, Wi-Fi connection information (e.g., a MAC address of an AP, an SSID, a channel number, a security key, or the like) or Bluetooth connection information (e.g., a link key) so as to be connected to each of the character doll A 1310 and the character doll B 1320 via short-range wireless communication.

As illustrated in FIG. 13D, according to an exemplary embodiment, the first terminal 100 may provide an episode list of episodes in which a character A and a character B appear. The first terminal 100 may receive at least one episode of the episode list from a user.

In this case, as illustrated in FIG. 13E, the first terminal 100 may replay the animation "XYZ" with the character doll A 1310 and the character doll B 1320. That is, the first terminal 100 may replay an episode selected by the user, and may transmit a control command to the character doll A 1310 and the character doll B 1320 via short-range wireless communication. The character doll A 1310 and the character doll B 1320 may output a line of speech contained in an episode based on the control command.

FIGS. 14A to 14D are schematic views for explaining a method of automatically connecting the first terminal 100 to an external device related to an instrument playing application, according to an exemplary embodiment.

As illustrated in FIG. 14A, the first terminal 100 may receive a selection of an instrument playing application from a user.

As illustrated in FIG. 14B, the first terminal 100 may search for, as an external device related to the instrument playing application, a guitar 1410, a pedal 1420, and a speaker 1430.

As illustrated in FIG. 14C, the first terminal 100 may transmit to each of the guitar 1410, the pedal 1420, and the speaker 1430, Wi-Fi connection information (e.g., a MAC address of an AP, an SSID, a channel number, a security key, or the like) or Bluetooth connection information (e.g., a link key) so as to be connected to each of the guitar 1410, the pedal 1420, and the speaker 1430 via short-range wireless communication.

As illustrated in FIG. 14D, the first terminal 100 may execute the instrument playing application with the guitar 1410, the pedal 1420, and the speaker 1430 connected thereto via short-range wireless communication.

FIGS. 15A and 15B are schematic views for explaining a method of automatically connecting the first terminal 100 to an external device, according to an exemplary embodiment.

As illustrated in FIG. 15A, the first terminal 100 may be connected to a guitar 1510, which is an external device, via short-range wireless communication. In this case, the first terminal 100 may search for an instrument playing application related to the guitar 1510.

The first terminal 100 may also search for another external device related to the instrument playing application. For example, the first terminal 100 may further search for a piano keyboard 1520 and a drum 1530 related to the instrument playing application.

As illustrated in FIG. 15B, the first terminal 100 may request each of the piano keyboard 1520 and the drum 1530 for connection by transmitting Wi-Fi connection information or Bluetooth connection information to each of the piano keyboard 1520 and the drum 1530 which are not yet connected to the first terminal 100. When the piano keyboard 1520 and the drum 1530 are connected to the first terminal 100 via short-range wireless communication, the first terminal 100 may execute the instrument playing application working along with the previously connected guitar 1510 and the piano keyboard 1520 and the drum 1530 which are connected thereafter.

Figure 16:
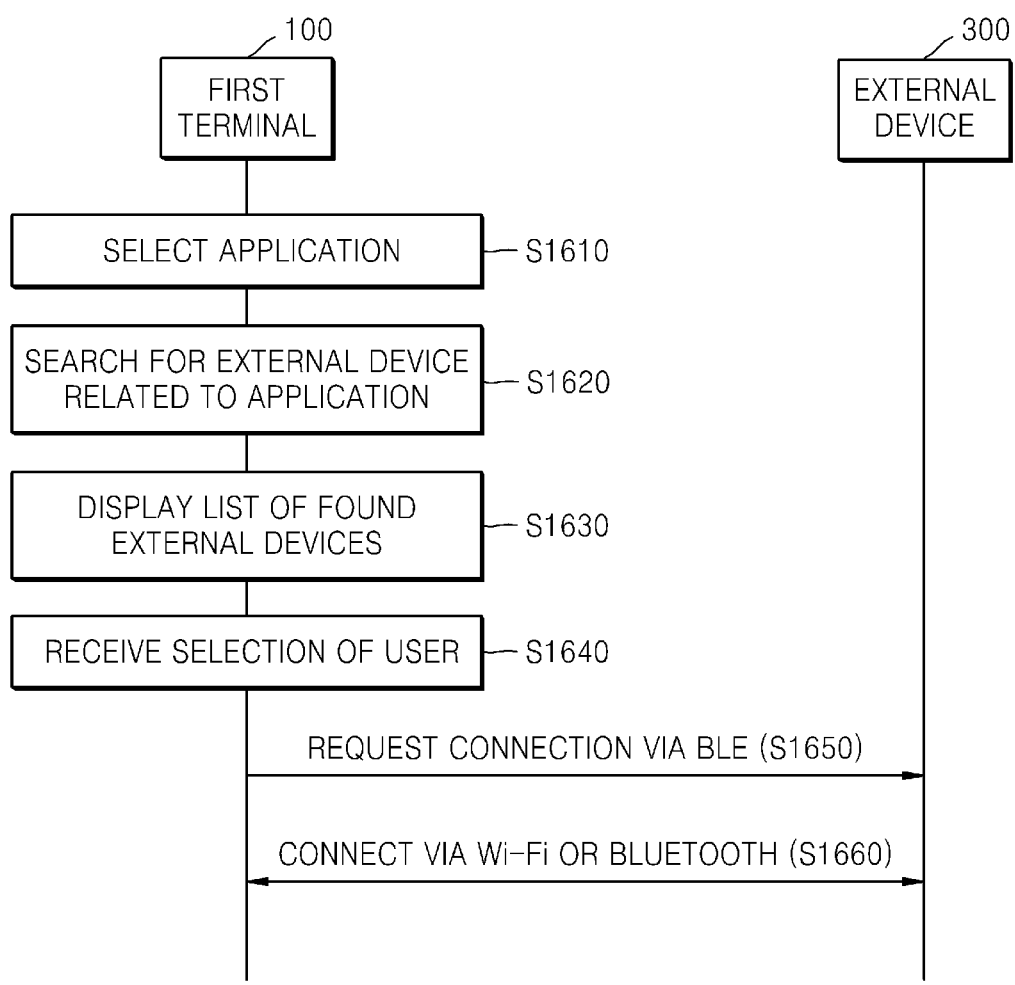
FIG. 16 is a flowchart illustrating a method of searching, by a first terminal, for an external device related to an application, according to an exemplary embodiment.

FIG. 16 is a flowchart illustrating a method of searching, by the first terminal 100, for an external device related to an application, according to an exemplary embodiment.

In operation S1610, the first terminal 100 may select an application upon receiving a user input. In operation S1620, the first terminal 100 may search for at least one external device related to the selected application. Operations S1610 and S1620 correspond to operations S1110 and S1120 of FIG. 11, and thus a detailed description thereof will be omitted here.

In operation S1630, when a plurality of external devices are found, the first terminal 100 may display a list of the found plurality of external devices on a screen.

In operation S1640, the first terminal 100 may receive a selection of a user of at least one external device 300 from the list of the plurality of external devices.

In operation S1650, the first terminal 100 may request the at least one external device 300 selected by the user, for connection, via BLE. That is, according to the current exemplary embodiment, the first terminal 100 may establish a connection with respect to only some of a plurality of external devices related to a predetermined application. While a connection request via BLE is illustrated here as an example, the exemplary embodiments are not limited thereto. Alternatively, operations S1630 and S1640 may be omitted. In other words, the first terminal 100 may automatically request the found plurality of external devices for connection.

The method of searching, by the first terminal 100, for an external device related to an application will be further described with reference to FIG. 17.

Figure 17A:
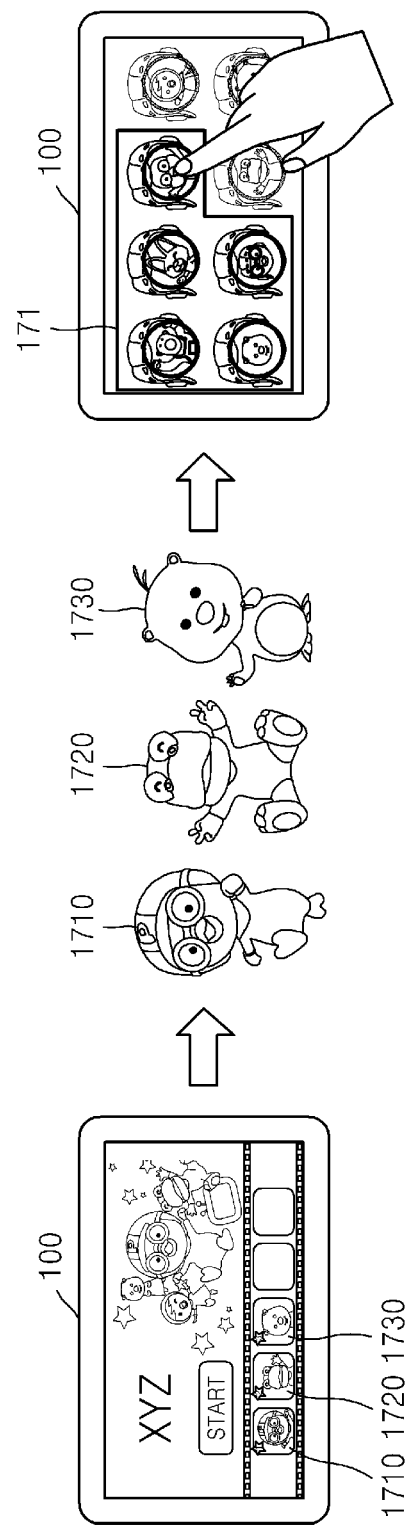
FIGS. 17A and 17B are schematic views for explaining a method of executing, by a first terminal, an application working along with an external device selected by a user, according to an exemplary embodiment.
Figure 17B:
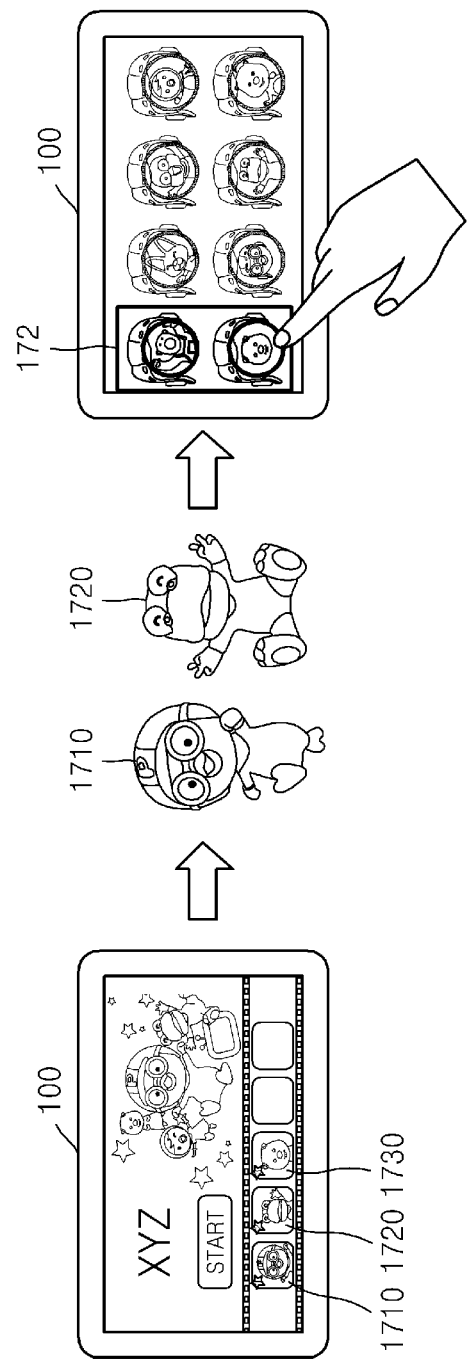

FIGS. 17A and 17B are schematic views for explaining a method of executing, by a first terminal, an application with an external device selected by a user, according to an exemplary embodiment.

As illustrated in FIG. 17A, the first terminal 100 may receive a selection of a user of an application for replaying an animation "XYZ". The first terminal 100 may also search for, as an external device related to the selected application, a character doll A 1710, a character doll B 1720, and a character doll C 1730, which are dolls of characters appearing in the animation "XYZ". The first terminal 100 may display a list of the character doll A 1710, the character doll B 1720, and the character doll C 1730 on a screen.

As illustrated in FIG. 17A, when a user selects all of three found external devices, the first terminal 100 may be connected to each of the character doll A 1710, the character doll B 1720, and the character doll C 1730. The first terminal 100 may provide an episode list 171 of the animation "XYZ" in which characters A, B, and C appear.

As illustrated in FIG. 17B, the user may just select only the character doll A 1710 and the character doll B 1720 from among the found three external devices. In this case, the first terminal 100 may establish a connection only with respect to the character doll A 1710 and the character doll B 1720 and provide an episode list 172 of episodes where only the characters A and B appear.

Figure 18:
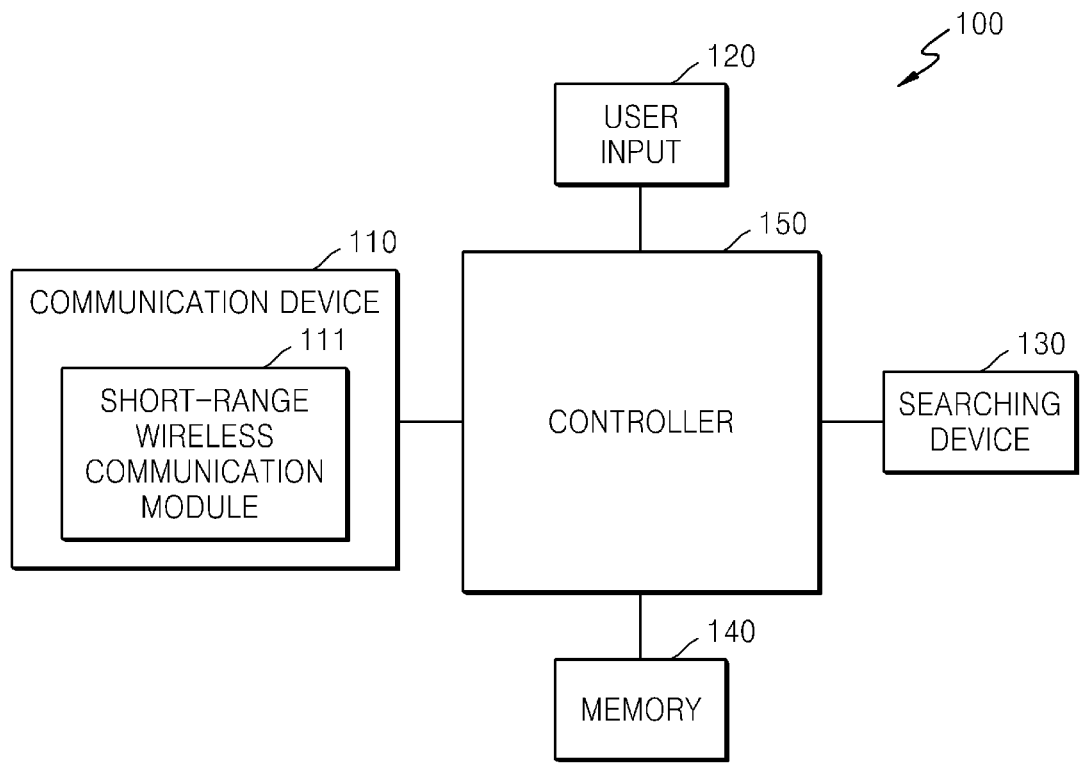
FIG. 18 is a block diagram illustrating a first terminal according to an exemplary embodiment.

FIG. 18 is a block diagram illustrating the first terminal 100 according to an exemplary embodiment.

As illustrated in FIG. 18, the first terminal 100 may include a communication device 110, a user input 120, a searching device 130, a memory 140, and a controller 150. However, all of the components shown in FIG. 18 are not essential. The first terminal 100 may be formed of more or less elements than the illustrated ones.

Hereinafter, the elements of the first terminal 100 will be described in detail.

The communication device 110 may include at least one element for communicating with the second terminal 200 or the external device 300. For example, the communication device 120 may include a short-range wireless communication module 111, a mobile communication module, a wireless internet module, a wired internet module, or the like.

The short-range wireless communication module 111 is a module for short-range wireless communication. Examples of the short-range wireless communication include WLAN (Wi-Fi), Bluetooth, BLE, UWB, ZigBee, NFC, WFD, and IrDa.

The mobile communication module transmits or receives a wireless signal to or from at least one of a base station, an external terminal, and a server on a mobile communication network. The wireless internet module refers to a module for wireless internet access, and may be embedded in the first terminal 100 or may be externally mounted from the first terminal 100. The wired internet module refers to a module for wired internet access.

According to the current exemplary embodiment, the communication device 110 may transmit to the second terminal 200 information about an application and connection information regarding the at least one external device 300. According to another exemplary embodiment, the communication device 110 may transmit information about an application to the second terminal 200 and transmit connection information regarding the second terminal 200 to the at least one external device 300.

The communication device 110 may transmit to the second terminal 200 a request for shifting a service related to an application being executed on the first terminal 100. When a distance between the first terminal 100 and the second terminal 200 is within a radius of short-range wireless communication, the communication device 110 may transmit to the second terminal 200 a request for shifting a service, via short-range wireless communication. The communication device 110 may receive an acceptance message about the request for shifting a service, from the second terminal 200.

The communication device 110 may receive a request for providing an application, from the second terminal 200, and transmit to the second terminal 200 an application or link information of the application. In addition, the communication device 110 may transmit registration information of the at least one external device 300 to the second terminal 200.

The communication device 110 may transmit to the second terminal 200 connection information of some of a plurality of external devices connected to the first terminal 100. Also, the communication device 110 may establish a connection with respect to the at least one external device 300 via BLE.

The user input 120 may receive a user input about the first terminal 100. For example, the user input 120 may receive a selection of an application from a user. Also, the user input 120 may receive a selection of a user of at least one external device from a list of a plurality of found external devices.

The user input 120 may be formed of, for example, a keypad, a dome switch, a touch pad (a static pressure type/electrostatic type), a jog wheel, or a jog switch. In particular, when the user input 120 is formed of a touch pad that forms an interlayer structure with a display, the user input 120 may be referred to as a touch screen.

The searching device 130 may search for at least one external device 300 related to an application selected by a user. For example, the searching device 130 may search for an application in the memory 140 based on identification information of the selected application.

According to an exemplary embodiment, when the first terminal 100 registers an external device 300, identification information of the external device 300 and an application are matched, and thus, the first terminal 100 may search a database for the external device 300 that matches the selected application.

The memory 140 may store programs for processing and controlling the controller 150. Also, the memory 140 may perform a function of storing data that is input or output. For example, the memory 140 may store registration information of the external device 300. Examples of the registration information of the external device 300 include identification information, authentication information, and application information of the external device 300. The application information of the external device 300 may be, for example, identification information of an application related to the external device 300 or link information of an application.

The memory 140 may be at least one of a flash memory type, a hard disk type, a multimedia card micro type, a card type memory (e.g., a Secure Digital (SD) or Extreme Digital (XD) memory), a random access memory (RAM), a static random access memory (SRAM), a read-only memory (ROM), an electrically erasable programmable read-only memory (EEPROM), a programmable read-only memory (PROM) magnetic memory, a magnetic disk, and an optical disk, but is not limited thereto. Also, the first terminal 100 may operate using a web storage function that stores data on the Internet.

The controller 150 controls the overall operation of the first terminal 100. For example, the controller 150 may execute an application with at least one external device 300 connected to the first terminal 100.

Also, when the second terminal 200 executes a first application with the at least one external device 300, the controller 150 may execute a second application related to the first application.

Figure 19:
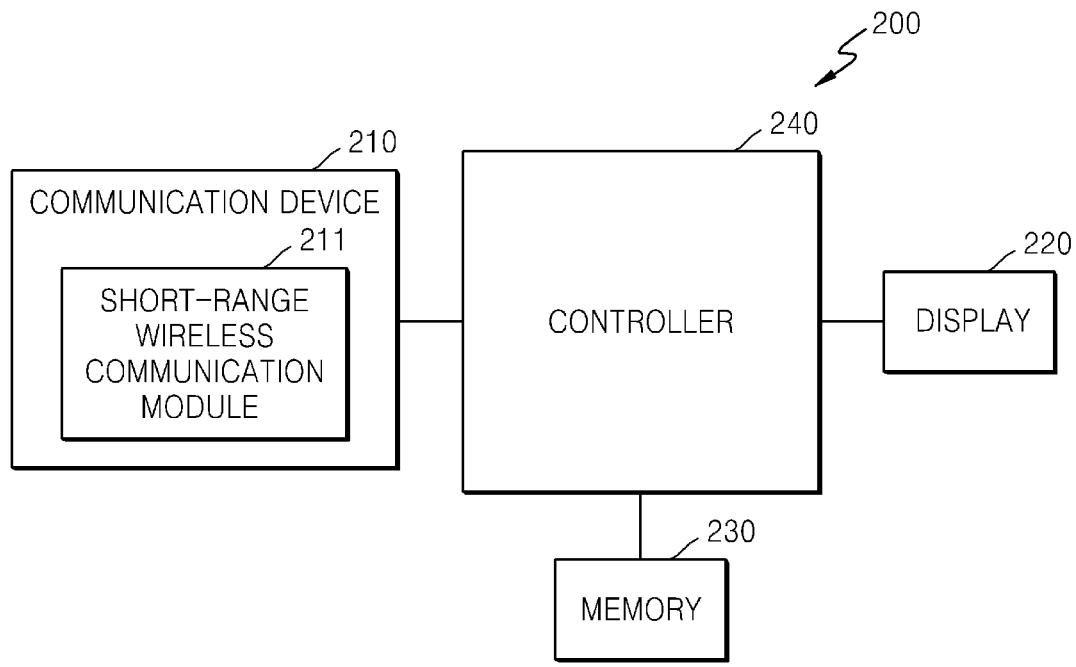
FIG. 19 is a block diagram illustrating a second terminal according to an exemplary embodiment.

FIG. 19 is a block diagram illustrating the second terminal 200 according to an exemplary embodiment.

As illustrated in FIG. 19, the second terminal 200 may include a communication device 210, a display 220, a memory 230, and a controller 240. However, all of the components shown in FIG. 19 are not essential. The second terminal 200 may be formed of more or less elements than the illustrated ones. Hereinafter, the elements of the second terminal 100 will be described in detail.

The communication device 210 may include at least one element for communicating with the first terminal 100 or the external device 300. For example, the communication device 210 may include a short-range wireless communication module 211, a mobile communication module, a wireless internet module, a wired internet module, or the like.

The short-range wireless communication module 211 is a module for short-range wireless communication. Examples of the short-range wireless communication include WLAN (Wi-Fi), Bluetooth, BLE, UWB, ZigBee, NFC, WFD, and IrDa.

The mobile communication module transmits or receives a wireless signal to or from at least one of a base station, an external terminal, and a server on a mobile communication network. The wireless internet module refers to a module for wireless internet access, and may be embedded in the second terminal 200 or may be externally mounted from the second terminal 200. The wired internet module refers to a module for wired internet access.

The communication device 210 may receive a request for shifting a service related to an application being executed on the first terminal 100, from the first terminal 100 and may transmit an acceptance message with regard to the request for shifting a service, to the first terminal 100. The communication device 210 may receive a request for shifting a service, from the first terminal 100 via short-range wireless communication.

Also, the communication device 210 may receive from the first terminal 100 information about an application being executed on the first terminal 100 and connection information regarding the at least one external device 300 connected to the first terminal 100. According to the current exemplary embodiment, the communication device 210 may receive connection information of some of a plurality of external devices connected to the first terminal 100.

The communication device 210 may establish a connection with respect to the at least one external device 300 based on connection information regarding the at least one external device 300. The communication device 210 may establish a short-range wireless communication connection with respect to the at least one external device 300.

According to an exemplary embodiment, the communication device 210 may receive registration information of the at least one external device 300 from the first terminal 100.

The display 220 may display and output information processed in the second terminal 200. For example, the display 220 may display a previously installed application on a screen.

When the display 220 and a touch pad are formed in an interlayer structure as a touch screen, the display 220 may also be used as an input device as well as an output device.

The display 220 may include at least one of a liquid crystal display (LCD), a thin film transistor-liquid crystal display (TFT-LCD), an organic light-emitting diode (OLED), a flexible display, a 3D display, an electrophoretic display, and a transparent display. According to a structure of the second terminal 200, at least two displays 220 may be included.

The memory 230 may store programs for processing and controlling of the controller 240. Also, the memory 230 may perform a function of storing data that is input or output. For example, the memory 230 may store registration information of the external device 300. Examples of the registration information of the external device 300 include identification information, authentication information, and application information of the external device 300. The application information of the external device 300 may be, for example, identification information of an application related to the external device 300 or link information of an application.

The controller 240 controls the overall operation of the second terminal 200. For example, the controller 240 may execute an application with at least one external device 300 connected to the second terminal 200 based on information about an application.

The controller 240 may receive an application from an external server or the first terminal 100 based on the information about the application, and install the application, and execute the installed application.

The exemplary embodiments may be implemented in the form of executable program commands through a variety of computer means and may be recordable to computer readable media. The computer readable media may include solely or in combination, program commands, data files and data structures. The program commands recorded to the media may be components specially designed for the exemplary embodiments or may be usable by one of ordinary skill in the art of computer software. Computer readable record media include magnetic media such as a hard disk, a floppy disk, and a magnetic tape, optical media such as CD-ROM and DVD, magneto-optical media such as floppy disk and hardware devices such as ROM, RAM and flash memory specially designed to store and carry out programs. Program commands include not only machine language code generated by a complier but also high level code that can be used by an interpreter or the like, which is executed by a computer.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of executing a first and a second software application on a first and a second terminal, respectively, the method comprising:
   executing, by the first terminal, the first software application related to at least one external device, to display multimedia content related to the at least one external device together with the at least one external device,
   wherein the at least one external device transmits a signal, to the first terminal, for controlling the multimedia content being executed through the first software application in the first terminal,
   wherein the at least one external device is wirelessly connected to the first terminal via a short range communication and
   wherein the at least one external device is a wireless peripheral device to the first terminal based on the wireless connection and includes at least one of an input device for wirelessly inputting to the first terminal;
   transmitting, by the first terminal to the second terminal, information about the first software application and connection information regarding the at least one external device, according to detecting the second terminal via a short range communication while the multimedia content is executed in the first terminal;
   establishing, by the second terminal, a wireless connection with respect to the at least one external device based on the transmitted connection information; and
   executing, by the second terminal, the second software application together with the at least one external device that is connected to the second terminal,
   wherein the second software application which is installed via software installation in the second terminal is executed based on the transmitted information about the first software application, and the second software application is for executing the multimedia content,
   wherein the first software is installed via software installation in the first terminal independently of a connection to the at least one external device, and
   wherein the transmitted information about the first software application comprises identification information of the first software application specific to the first software application, information representing a current state of the multimedia content being executed in the first terminal, and information about the at least one external device.

2. The method of claim 1, further comprising:
   transmitting, by the first terminal, to the second terminal a request for shifting a service related to the first software application being executed on the first terminal; and
   receiving, by the first terminal, from the second terminal, an acceptance message regarding the request for shifting the service.

3. The method of claim 2, wherein the transmitting of the request for shifting the service comprises, when a distance between the first terminal and the second terminal is within a radius of short-range wireless communication, transmitting the request for shifting the service via the short-range wireless communication.

4. The method of claim 1, wherein the information about the first software application comprises at least one of execution status information of the first software application.

5. The method of claim 1, wherein the executing of the second software application performed by the second terminal comprises:
   receiving the second software application from an external server or the first terminal based on the information about the first software application and installing the second software application; and
   executing the installed second software application.

6. The method of claim 1, wherein the executing of the second software application performed by the second terminal comprises determining if the second software application is previously installed in the second terminal, and if it is determined that the second software application is previously installed in the second terminal, displaying the second software application on a screen based on the information about the first application.

7. The method of claim 1, wherein the establishing of the wireless connection comprises establishing a short-range wireless communication connection with respect to the at least one external device.

8. The method of claim 7, wherein the short-range wireless communication comprises at least one of Wi-Fi, Bluetooth, Wi-Fi Direct (WFD), Ultra Wideband (UWB), and Zigbee.

9. The method of claim 1, further comprising:
   when the second terminal executes the second software application with the at least one external device, executing, by the first terminal, another software application related to the executed second software application.

10. The method of claim 1, wherein the executing of the first software application with the at least one external device connected to the first terminal, as performed by the first terminal, comprises:
    receiving a selection of the first software application from a user; and
    searching for the at least one external device related to the first software application.

11. The method of claim 10, wherein the searching for the at least one external device comprises establishing a connection with respect to a found, at least one external device, via Bluetooth Low Energy (BLE).

12. The method of claim 1, further comprising:
    when the second terminal executes the second software application with the at least one external device, ending the execution of the first software application being executed on the first terminal, wherein the ending of the execution is performed by the first terminal.

13. The method of claim 1, wherein the transmitting of the connection information regarding the at least one external device comprises transmitting a plurality of connection information respectively of some of a plurality of external devices connected to the first terminal.

14. A method of executing a first software application on a first terminal by the first terminal, the method comprising:
    executing the first software application related to at least one external device, to display multimedia content related to the at least one external device, to display multimedia content related to the at least one external device together with at least one external device,
wherein the at least one external device transmits a signal, to the first terminal, for controlling the multimedia content being executed through the first software application in the first terminal,
wherein the at least one external device is wirelessly connected to the first terminal via a short range communication and
wherein the at least one external device is a wireless peripheral device to the first terminal based on the wireless connection and includes at least one of an input device for wirelessly inputting to the first terminal; and
transmitting, to a second terminal, information about the first software application and connection information regarding the at least one external device, according to detecting the second terminal via a short range communication while the multimedia content is executed in the first terminal,
wherein the connection information regarding the at least one external device is information for establishing a wireless connection with respect to the at least one external device by the second terminal,
wherein the information about the first software application is information applied by the second terminal to execute a second software application together with the at least one external device, and the second software application is for executing the multimedia content,
wherein the first software application is installed via software installation in the first terminal independently of a connection to the at least one external device, and
wherein the transmitted information about the first software application comprises identification information of the first software application specific to the first software application, information representing a current state of the multimedia content being executed in the first terminal, and information about the at least one external device.

15. The method of claim 14, further comprising:
transmitting to the second terminal a request for shifting a service related to the first software application being executed on the first terminal; and
receiving an acceptance message from the second terminal regarding the request for shifting the service.

16. The method of claim 15, wherein the transmitting of the request for shifting the service comprises, when a distance between the first terminal and the second terminal is within a radius of short-range wireless communication, transmitting the request for shifting the service to the second terminal via short-range wireless communication.

17. The method of claim 15, wherein the transmitting of the request for shifting the service comprises transmitting the request for shifting the service to the second terminal based on a direction of a dragging touch input received from a user.

18. The method of claim 14, further comprising:
receiving a request for providing the second software application from the second terminal when the second software application is not previously installed in the second terminal; and
transmitting the first software application to the second terminal.

19. The method of claim 14, further comprising:
when the second terminal executes the second software application with the at least one external device, executing another software application related to the executed second software application.

20. The method of claim 14, wherein the executing of the first software application by the first terminal with the at least one external device connected to the first terminal comprises:
receiving a selection of the first software application from a user; and
searching for the at least one external device related to the first software application.

21. The method of claim 20, wherein the searching for the at least one external device comprises establishing a connection with respect to the at least one found external device, via Bluetooth Low Energy (BLE).

22. The method of claim 14, further comprising:
when the second terminal executes the second software application with the at least one external device, ending execution of the first software application being executed on the first terminal.

23. A method of executing a second software application on a second terminal by the second terminal, the method comprising:
receiving, from a first terminal, information about a first software application related to at least one external device, to display multimedia content related to the at least one external device being executed on the first terminal, and
connection information regarding at least one external device according to a detecting by the first terminal of the second terminal via a short range communication while multimedia content is executed in the first terminal,
wherein the at least one external device transmits a signal, to the first terminal, for controlling the multimedia content being executed through the first software application in the first terminal,
wherein the at least one external device is wirelessly connected to the first terminal via a short range communication and
wherein the at least one external device is a wireless peripheral device to the first terminal based on the wireless connection and includes at least one of an input device for wirelessly inputting to the first terminal;
establishing a wireless connection with respect to the at least one external device based on the connection information; and
executing the second software application together with the at least one external device that is connected to the second terminal based on the information about the first software application, and the second software application is for executing the multimedia content,
wherein the executed second software application is installed via software installation in the second terminal prior to the wireless connection with respect to the at least one external device, and
wherein the information about the first software application comprises identification information of the first software application specific to the first software application, information representing a current state of the multimedia content being executed in the first terminal, and information about the at least one external device.

24. The method of claim 23, further comprising:
receiving, from the first terminal, a request for shifting a service related to the first software application being executed on the first terminal; and transmitting, to the first terminal, an acceptance message regarding the request for shifting the service.

25. The method of claim 24, wherein the receiving of the request for shifting the service comprises receiving the request for shifting the service from the first terminal via short-range wireless communication.

26. The method of claim 23, wherein the executing of the second software application performed by the second terminal comprises:
receiving the second software application from an external server or the first terminal based on the information about the first software application and installing the second software application; and
executing the installed second software application.

27. The method of claim 23, wherein the executing of the second software application by the second terminal comprises displaying the second software application that is previously installed in the second terminal on a screen based on the information about the first software application.

28. The method of claim 23, wherein the establishing of the wireless connection comprises establishing a short-range wireless communication connection with respect to the at least one external device.

29. The method of claim 23, wherein the receiving of the information about the first application and the connection information comprises receiving registration information of the at least one external device from the first terminal.

30. The method of claim 23, wherein the receiving of the connection information regarding the at least one external device comprises receiving a plurality of connection information respectively regarding some of a plurality of external devices connected to the first terminal.

31. A first terminal comprising:
at least one processor configured to execute a first software application related to at least one external device, to display multimedia content related to the at least one external device together with the at least one external device, wherein the at least one external device transmits a signal, to the first terminal, for controlling the multimedia content being executed through the first software application in the first terminal, wherein the at least one external device is wirelessly connected to the first terminal via a short range communication and wherein the at least one external device is a wireless peripheral device to the first terminal based on the wireless connection and includes at least one of an input device for wirelessly inputting to the first terminal; and
a communication device configured to transmit to a second terminal information about the first software application and connection information regarding the at least one external device, according to detecting the second terminal via a short range communication while the multimedia content is executed in the first terminal,
wherein the connection information regarding the at least one external device is information for establishing a wireless connection by the second terminal with the at least one external device, and
wherein the information about the first software application is information applied by the second terminal to execute a second software application together with the at least one external device, and the second software application is for executing the multimedia content,
wherein the first software application is installed via software installation in the first terminal independently of a connection to the at least one external device, and
wherein the transmitted information about the first software application comprises identification information of the first software application specific to the first software application, information representing a current state of the multimedia content being executed in the first terminal, and information about the at least one external device.

32. The first terminal of claim 31, further comprising:
a user input configured to receive a selection of the first software application from a user; and
a searching device configured to search for the at least one external device related to the first software application.

33. A second terminal comprising:
a communication device configured to receive information about a first software application related to at least one external device, displaying multimedia content related to at least one external device, being executed on a first terminal according to a detecting by the first terminal of the second terminal via a short range communication while the multimedia content is executed in the first terminal, and connection information regarding at least one external device, wherein the at least one external device transmits a signal, to the first terminal, for controlling the multimedia content being executed through the first software application in the first terminal, and configured to establish communication connection with respect to the at least one external device based on the connection information, wherein the at least one external device is wirelessly connected to the first terminal via a short range communication and wherein the at least one external device is a wireless peripheral device to the first terminal based on the wireless connection and includes at least one of an input device for wirelessly inputting to the first terminal; and
at least one processor configured to execute a second software application together with at least one external device wirelessly connected to the second terminal based on the information about the first software application, wherein the second software application is for executing the multimedia content,
wherein the executed second software application is installed via software installation in the second terminal prior to the wireless connection with respect to the at least one external device, and
wherein the information about the first software application comprises identification information of the first software application specific to the first software application, information representing a current state of the multimedia content being executed in the first terminal, and information about the at least one external device.

34. The second terminal of claim 33, wherein the second terminal further comprises a display configured to display on a screen the second software application previously installed in the second terminal based on the information about the first software application.

35. A non-transitory computer readable recording medium having embodied thereon a program for executing the method of executing an application of claim 1.

* * * * *